(12) United States Patent
Iwasaki

(10) Patent No.: US 6,563,626 B1
(45) Date of Patent: May 13, 2003

(54) DISPLAY DEVICE

(75) Inventor: Takeo Iwasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/511,996

(22) Filed: Feb. 24, 2000

(30) Foreign Application Priority Data

| Feb. 25, 1999 | (JP) | 11-047857 |
| Feb. 25, 1999 | (JP) | 11-047858 |
| Mar. 10, 1999 | (JP) | 11-062461 |

(51) Int. Cl.[7] .................. G02B 26/00; G02B 27/14; H04N 7/14
(52) U.S. Cl. ................. 359/292; 359/630; 359/633; 348/14.16
(58) Field of Search ............... 359/292, 630, 359/633, 636, 631; 348/14.16, 14.01, 373

(56) References Cited

U.S. PATENT DOCUMENTS

| 5,590,090 A | * | 12/1996 | Duggal et al. | 367/7 |
| 5,828,427 A | * | 10/1998 | Faris | 349/5 |
| 5,986,804 A | * | 11/1999 | Mashitani | 359/462 |
| 6,094,181 A | * | 7/2000 | Hildebrand et al. | 345/8 |
| 6,147,805 A | * | 11/2000 | Fergason | 359/630 |
| 6,211,903 B1 | * | 4/2001 | Bullister | 348/14.16 |
| 6,259,787 B1 | * | 5/2001 | Schulze | 379/352 |
| 6,243,186 B1 | * | 6/2001 | Melville | 359/199 |
| 6,385,352 B1 | * | 5/2002 | Roustaci | 382/324 |

FOREIGN PATENT DOCUMENTS

| JP | 5-91582 | 4/1993 |
| JP | 6-102467 | 4/1994 |

* cited by examiner

Primary Examiner—Georgia Epps
Assistant Examiner—Tim Thompson
(74) Attorney, Agent, or Firm—Oliff & Berridge PLC

(57) ABSTRACT

A display device has a white point light source, a condenser lens, a liquid crystal display, and an imaging lens. The white point light source has a substantial conjugate relationship with a user's pupil that is located on the front surface of the user's eyeball. The liquid crystal display has a substantial conjugate relationship with the user's retina. The scattering plate is further provided to broaden the bundle width of the light at a location in the vicinity of the user's pupil.

28 Claims, 28 Drawing Sheets $I(\theta)\,[cd] = \cos^n \theta$

DISPLAY DEVICE

BACKGROUND OF THE INVENTION

1. Field of the Invention

The present invention relates to a display device including a spatial light modulator such as a liquid crystal display.

2. Description of Related Art

A liquid crystal display (LCD) is a well known example of display devices.

As shown in FIG. 1, a conventional display device 300 includes: a fluorescent lamp 302, a liquid crystal display 304, and an imaging lens 306. The fluorescent lamp 302 serves as a surface light source. The liquid crystal display 304 modulates light from the fluorescent lamp 302 to selectively transmit the light therethrough. The imaging lens 306 receives the light from the liquid crystal display 304 and focuses the light onto a retina 310 in the eyeball 308 of a user, thereby producing an image on the retina 310. The display device 300 with this configuration allows the user to view the image formed from the light modulated by the liquid crystal display 304.

However, the display device 300 of FIG. 1 has the following problems.

First, because the fluorescent lamp 302 is a type of light source that diffuses light, a focal depth where the image is into focus is shallow. Therefore, the image likely becomes out of focus and becomes fuzzy.

More specifically, it is now assumed that an imaginary stop or diaphragm 314 is located in front of a single point on the liquid crystal display 304 as shown in FIG. 1 for explanation purposes. The imaginary stop 314 is not actually provided. Light emitted from the entire region of the fluorescent lamp 302 falls incident on the single point of the liquid crystal display 304 at an angle of incidence θ1 after passing through the imaginary stop 314. For this reason, the incident angle θ1 becomes large. Then, the light emits from the same point of the liquid crystal display 304 at an angle of emission θ2 which is substantially equal to the incident angle θ1. The emission angle θ2 is therefore also large. Accordingly, only a portion of the entire emission light will fall incident on the imaging lens 306. More specifically, in the entire emission light within the emission angle θ2, only the portion of the light within an angle θ3 falls incident on the imaging lens 306. After passing through the imaging lens 306, only a portion d1 of the light falls incident on the pupil of a user's eyeball. The pupil is surrounded by an iris 316. After entering the pupil, the light finally reaches the retina 310 after passing through a crystalline lens 318. In this way, light emitted from the single point on the liquid crystal display 304 focuses onto the retina 310 at a relatively large angle θ4 which has a size corresponding to the almost entire region of the crystalline lens 318. Accordingly, the focal depth of the light that forms an image on the retina 310 is shallow, so if the focus 320 shifts slightly forward or behind the retina 310, the image will appear out of focus and fuzzy.

Also, with this configuration, light is emitted from the single point of the liquid crystal display 304 in the large emission angle θ2. Therefore, when the liquid crystal display 304 is exposed to the outside, the image displayed on the liquid crystal display 304 can be seen by people other than the user, so that the displayed image cannot be kept secret or confidential.

Also, the fluorescent lamp 320 consumes a great deal of power. This is a particularly problem when the display device 300 is used as a part of a portable device because the high power consumption quickly drains batteries.

SUMMARY OF THE INVENTION

In view of the above-described drawbacks, it is an objective of the present invention to provide an improved display device with an increased range of focal depth of light forming images on a retina so that images almost never appear out of focus.

It is another objective of the present invention to provide an improved display device with high degree of confidentiality so that people other than the user cannot see the image formed by the spatial light modulator.

It is still a further objective of the present invention to provide an improved display device with low power consumption and capable of suppressing the consumption of butteries when assembled as a part of a portable machine.

In order to attain the above and other objects, the present invention provides a display device, comprising: a point light source that emits white light; a spatial light modulator spatially modulating the light emitted from the point light source to produce an imaging light; and an optical imaging system receiving the imaging light modulated by the spatial light modulator and producing an image.

Because the display device employs the point light source, the spatial light modulator emits the modulated imaging light at a relatively small angle of emission. Accordingly, even when a user's eye slightly moves along the optical axis of the display device, the image on the user's eye will not become out of focus and will not appear blurry.

The display device may preferably further comprise an optical light-collecting system gathering the light from the point light source, the spatial light modulator receiving the light collected by the optical light-collecting system and spatially modulating the light to produce the imaging light.

With the structure, light emitted from the point light source is collected by the optical light-collecting system, such as a condenser lens, and reaches the spatial light modulator. After being modulated by the spatial light modulator, the light emits from the spatial light modulator at a relatively small angle of emission. As a result, the light enters a user's eyeball at a small angle of convergence. Accordingly, the light focuses on the user's retina with a deep focal depth. Even when the user's retina slightly moves along the optical axis of the display device, the image formed on the user's retina will not be out of focus.

Additionally, because the light emits the spatial light modulator at the relatively small emission angle, the image formed by the light will not be seen by someone other than the user who is situated at a position behind the optical imaging system.

The optical imaging system may preferably be located to cause the point light source and a first position, which is located behind the optical imaging system and which is separated from the optical imaging system by a desired distance, to have substantially a conjugate relationship and to cause the spatial light modulator and a second position, which is located behind the first position and which is separated from the first position by a distance substantially equal to a distance between a pupil and a retina of a user's eye, to have substantially a conjugate relationship.

When the point light source and the first position have the substantial conjugate relationship, the almost entire part of the light that has passed through the optical light-collecting system can be guided into the user's eyeball through the pupil. Accordingly, the point light source needs only to have a smaller light emitting power in order to irradiate the interior of the pupil with a fixed amount of optical power. It is therefore possible to suppress the power consumed by the point light source. When the spatial light modulator and the second position have the substantial conjugate relationship, light modulated by the spatial light modulator can be observed at the second position.

The display device may preferably further include a scattering plate located between the point light source and the spatial light modulator. In comparison with the case where no scattering plate is provided, a light bundle emitted from a single point of the spatial light modulator will spread in a relatively wide range at a position in the vicinity of the user's pupil, for example. Accordingly, it is ensured that the light bundle can be guided into the user's eyeball even when the user's eyeball slightly shifts in a direction normal to the optical axis of the display device. There will be little variation in the intensity of the formed image.

Also when the scattering plate is thus additionally provided in the display device, the optical imaging system may preferably be located to cause the point light source and a first position, which is located behind the optical imaging system and which is separated from the optical imaging system by a desired distance, to have substantially a conjugate relationship and to cause the spatial light modulator and a second position, which is located behind the first position and which is separated from the first position by a distance substantially equal to a distance between a pupil and a retina of a user's eye, to have substantially a conjugate relationship.

When the point light source and the first position have the substantial conjugate relationship, regardless of the scattering plate, a large part of the light that has passed through the optical light-collecting system can be guided into the user's eyeball through the pupil. Accordingly, the point light source needs only to have a smaller light emitting power in order to irradiate the interior of the pupil with a fixed amount of optical power. It is therefore possible to suppress the power consumed by the point light source. When the spatial light modulator and the second position have the substantial conjugate relationship, light modulated by the spatial light modulator can be observed at the second position.

The display device may further comprise a holding portion that enables a user to transport the casing. For example, the holding portion may include a portion for being supported by at least one hand of a user. Or, the holding portion may include a portion for being attached to a user's head. The holding portion may include a portion for being attached to a frame of a pair of glasses. The display device may further comprise an image pick up device for picking up an image of the user's face.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
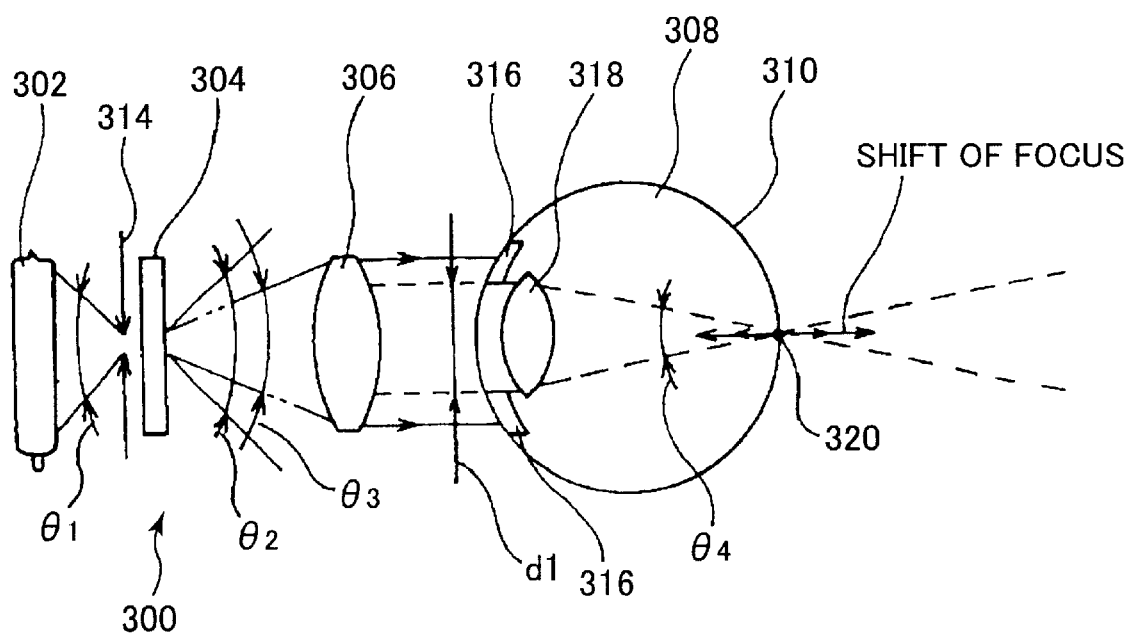
FIG. 1 is a schematic view showing a conventional display device.

A display device according to preferred embodiments of the present invention will be described while referring to the accompanying drawings wherein like parts and components are designated by the same reference numerals to avoid duplicating description.

A first embodiment of the present invention will be described while referring to FIGS. 2A through 11.

Figure 2A:
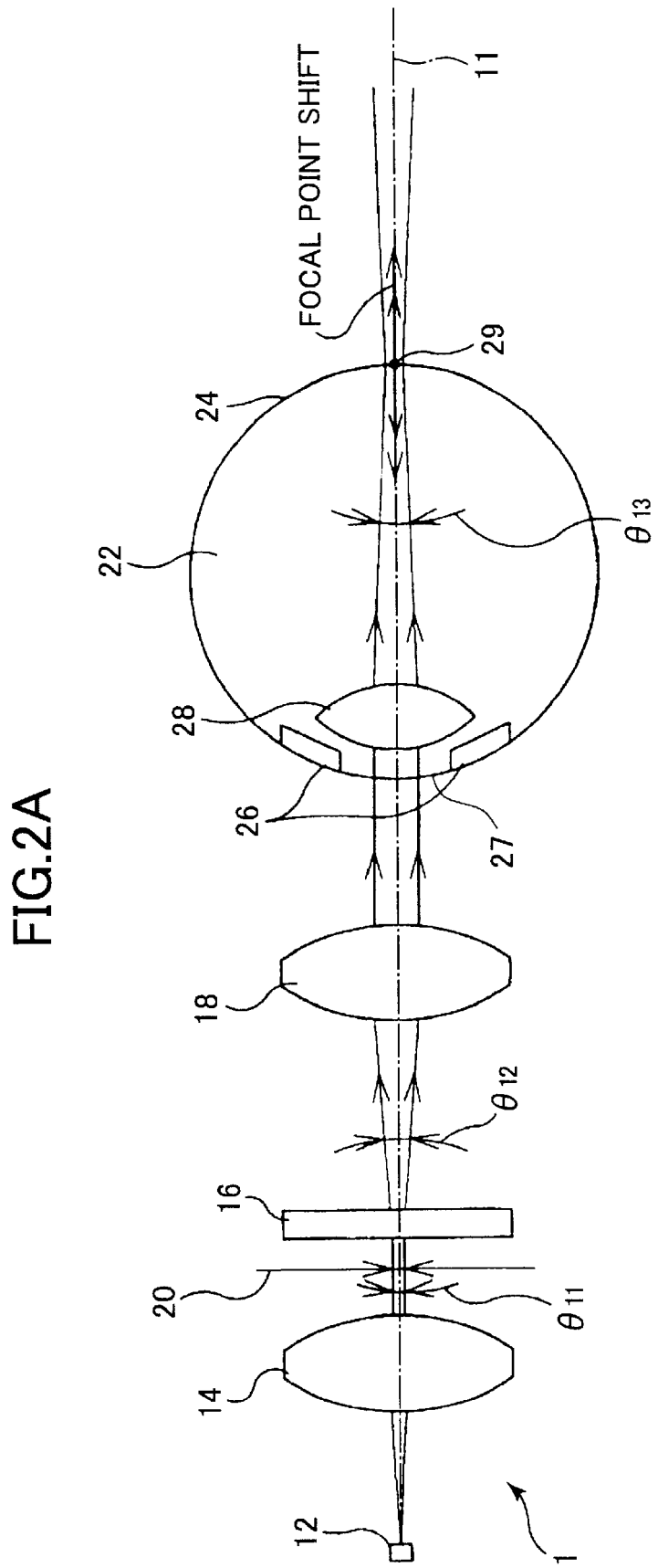
FIG. 2A is a schematic view showing a display device according to a first embodiment of the present invention.
Figure 2B:
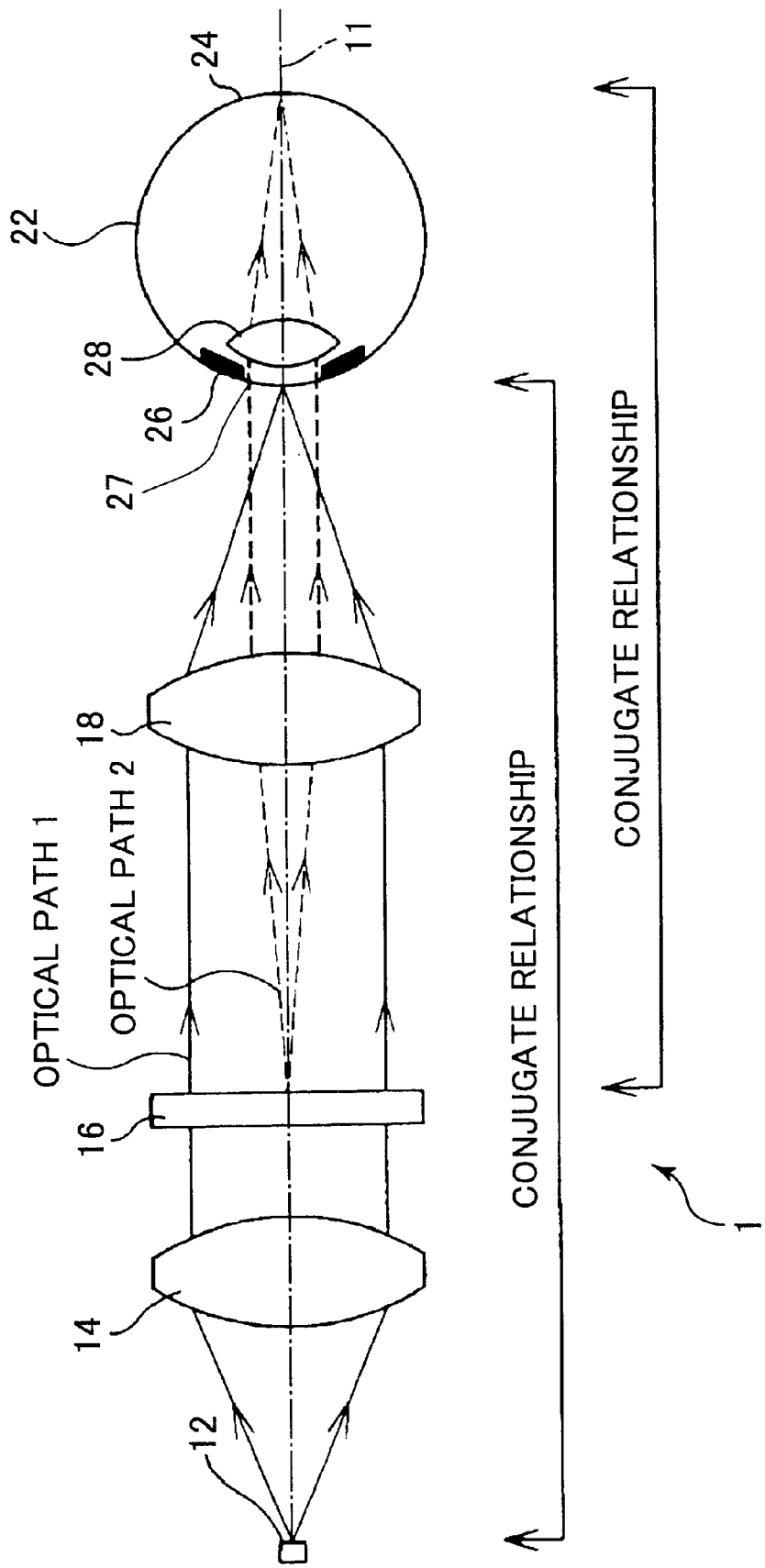
FIG. 2B is a schematic view illustrating an optically conjugate relationship between components in the display device of the first embodiment.

FIG. 2A is a schematic view showing a display device according to the first embodiment of the present invention. FIG. 2B is a schematic view explaining the optically conjugate relationship in the display device of FIG. 2A.

First, the principle of the display device of the present embodiment will be described below with referring to FIG. 2A.

As shown in FIG. 2A, the display device 1 includes: a white light emission diode (LED) 12, a condenser lens 14, a liquid crystal display (LCD) 16, and an imaging lens 18. The white LED 12 serves as a point light source for emitting white light. The condenser lens 14 is a convex lens having positive power to collect or gather light emitted from the white LED 12. The liquid crystal display 16 is of a color display type, and serves as a spatial light modulator for modulating light collected by the condenser lens 14 to selectively transmit the modulated light therethrough. The imaging lens 18 is a convex lens system that is comprised from one or more lenses and that totally has positive power to receive the light modulated by the liquid crystal display 16 to form images on a retina 24 of the user's eyeball 22. It is noted that the convex lens system 18 may include one or more concave or planar (parallel) lenses. Even in this case, the entire convex lens system 18 is designed to totally have positive power.

It will be assumed that an imaginary stop or diaphragm 20 is located in front of a single point of the liquid crystal display 16 as shown in FIG. 2A for explanation purposes. The imaginary stop 20 is not actually provided. Light emitted from the white LED (point light source) 12 falls incident on the single point of the liquid crystal display 16 at a relatively small angel of incidence $\theta 11$, after passing through the imaginary stop 20. The light then emits from the same single point on the liquid crystal display 16 at an emission angle $\theta 12$ which is substantially equal to the angle of incidence $\theta 11$. Accordingly, the emission angle $\theta 12$ is relatively small. Almost all of the light, that diverges at the emission angle $\theta 12$ from the liquid crystal display 16, falls incident on the imaging lens 18. Almost all of the light that has passed through the imaging lens 18 falls incident on the user's pupil 27 that is surrounded by the iris 26 and reaches the user's retina 24 via the crystalline lens 28.

In this way, by using the point light source 12 and the condenser lens 14, not only the emission angle $\theta 12$, at which light emits from the single point on the liquid crystal display 16, is made relatively small, but also the converging angle $\theta 13$, at which light focuses to form an image on the focal point 29 on the retina 24, is made relatively small in correspondence to only a portion of the region of the crystalline lens 28. Accordingly, the focal depth of light forming an image on the retina 24 is made deeper so that the formed image will almost never appear out of focus even when the relative position of the user's eye 22 with respect to the display device 1 changes along the optical axis 11 of the display device 1. In other words, the image will almost never appear out of focus even when there occurs a focal shift in the optical axis direction. Accordingly, the user can view clear images ordinarily without any means to adjust the focus of the device.

Also, according to the present embodiment, the emission angle $\theta 12$, at which light emits from the single point on the liquid crystal display 16, is relatively small. Accordingly, almost none of the emitted light will reach people other than the user who is located at a predetermined position along the optical axis 11 of the display device 1. Accordingly, even when the color liquid crystal display 16 is exposed to the outside, the image displayed on the liquid crystal display 16 will almost never be seen by someone other than the user so that the displayed image can be kept extremely confidential.

FIG. 2B shows details of the locations of the respective components in the display device 1 along the optical axis 11. As shown in FIG. 2B, light emitted from the white LED 12 follows the optical path 1, before focusing on the front surface (pupil 27) of the eye of the user, who is situated at the predetermined position on the optical axis 11. In other words, the white LED 12 and the pupil 27 have a conjugate relationship with each other. In order to establish this conjugate relationship, the imaging lens 18 is disposed at such a position that corresponds to the position of the user's pupil 27 relative to the white LED 12 that is assembled in the display device 1 in a manner depending on the actual configuration of the display device 1. With this conjugate relationship between the LED 12 and the user's pupil 17, light that has emitted from the white LED 12 and that has passed through the condenser lens 14 can almost entirely pass through the user's crystalline lens 28 and can finally reach the user's retina 24 without being blocked by his/her iris 26. For this reason, in comparison with the configuration in FIG. 1 wherein light reaching the pupil is partly blocked by the iris, the white LED 12 needs only to have a smaller light emitting power in order to irradiate the interior of the pupil with the same amount of optical power. Thus, it is possible to suppress the power consumed by the white LED 12.

In the above-described example, light emitted from the white LED 12 focuses exactly on the front surface, that is, the pupil 27, of the user's eye. However, as long as the light is incident on the interior of the pupil without being blocked by the iris 26, the focal point can be slightly shifted frontward or rearward along the optical axis direction.

Also as shown in FIG. 2B, light that is modulated by the liquid crystal display 16 at its single point and that emits from the liquid crystal display 16 follows another optical path 2, and finally forms an image on the retina 24 of the user who is located at the predetermined position. In other words, the liquid crystal display 16 and the retina 24 are positioned also at a conjugate relationship with each other. The user can therefore view an image formed from the light modulated by the liquid crystal display 16. Although the light that follows the optical path 2 passes through the crystalline lens 28 of the user, because the adjustment range of the user's crystalline lens 28 is relatively shallow, the above-described conjugate relationship is established by adjusting the position of the imaging lens 18.

Because the white LED 12, which serves as a point light source, emits white light, the liquid crystal display 16 can display a full color image. Though a fluorescent lamp (surface light source) that emits white light or a laser light source that emits a monochromatic light can be used instead of the white LED, using the point light source 12 that emits white light has the additional benefit of enabling a user to view a full color image. This makes the display device 1 extremely practical.

Figure 3A:
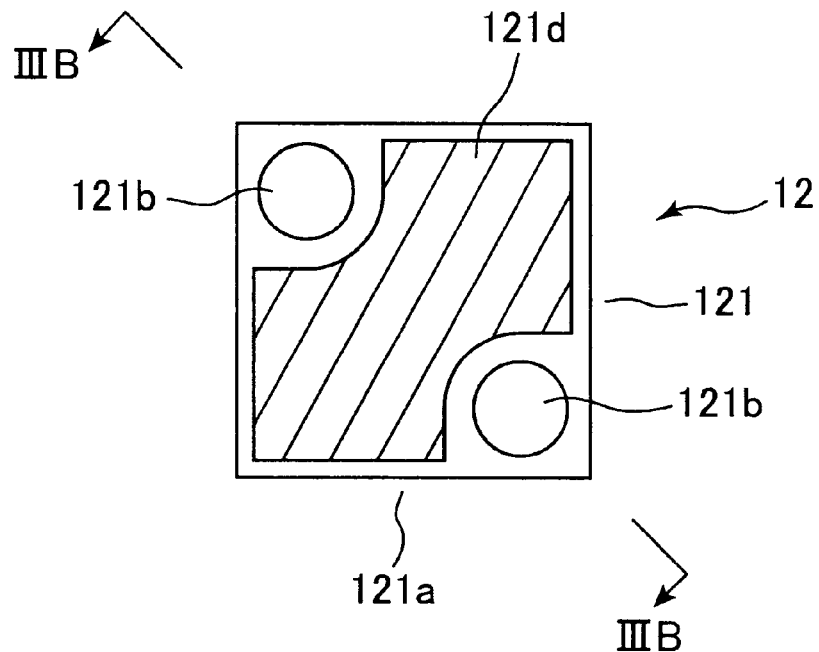
FIG. 3A is an upper view of a white LED employed in the display device of the first embodiment.
Figure 3B:
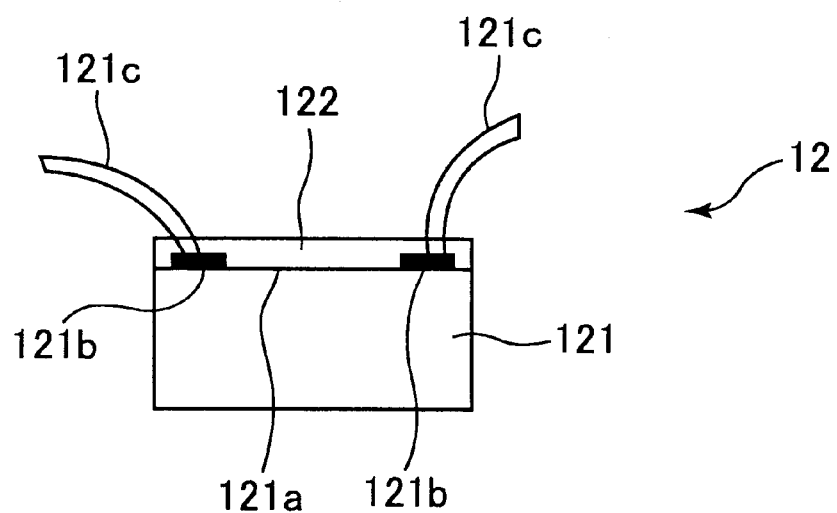
FIG. 3B is a cross-sectional view of the white LED taken along a line IIIB—IIIB.

In the present embodiment, as shown in FIG. 3B, the white LED 12 has a blue LED 121 whose upper surface 121a is coated with a fluorescent material 122. A pair of electrodes 121b are mounted on the upper surface 121a of the blue LED 121 as shown in FIGS. 3A and 3B. The electrodes 121b are connected to a pair of wires 121c. When electric currents are supplied to the blue LED 121 via the wires 121c, the blue LED 121 emits blue light at its light emitting portion 121d, which is defined between the pair of electrodes 121b as shown in FIG. 3A. The light emitting portion 121d has a light emitting area of about 300 $\mu m^2$. It is noted that the light emitting area of a light source is generally defined as the projected area of a light emitting portion (121d, in this example) of the light source when observing the light source from a location downstream from the light source in the direction of light emission. The fluorescent material 122 receives blue light from the blue LED 121, and emits light in a variety of wavelength in the visual light range. Accordingly, the white LED 12 emits white light as a whole. In the present embodiment, the white LED 12 having the above-described structure is located in the display device 1 so that the fluorescent material 122 provided on the outer surface 121a of the blue LED 121 will confront the condenser lens 14.

By using the white LED 12 constructed from the blue LED 121, the light source can be formed in a compact form. Also, the light source with an extremely small light emitting area can be inexpensively realized. Because a LED, which can be driven with a very low amount of power, is used as a light source, the consumption of power can be greatly reduced.

An ultraviolet LED can be used instead of the blue light LED 121. The ultraviolet LED has the same configuration as the blue light LED 121 shown in FIGS. 3A and 3B. The white LED 12 can therefore be constructed by providing fluorescent material 122 over the outer surface of the ultraviolet LED in the same manner as shown in FIG. 3B.

The point light source which emits white light can be made also from a combination of three LEDs that respectively emit three colors of red, green, and blue. The point light source can also be made from an ordinary white light source, such as a halogen lamp, a fluorescent lamp, or a small light bulb, in combination with a shield member than is located behind the white light source and that is formed with a pin hole. However, it is desirable to use either a blue LED or a ultraviolet LED as the white LED 12 because of the benefits described above.

In the above-described example, the light emitting portion 121d of the white LED 12 has the light emitting area of about 300 $\mu m^2$. It is desirable that the point light source 12 have the light emitting area of 1 $mm^2$ or less. By providing the point light source with a light emitting area of 1 $mm^2$ or less, the light beam can be prevented from spreading, thereby increasing the benefits, such as the great focal depth and the high confidentiality, derived from the structure of the display device 1.

As described above, according to the present embodiment, the display device 1 is provided with: the LED (point light source) 12, the condenser lens 14, the liquid crystal display 16, and the imaging lens 18. The white LED 12 has a substantial conjugate relationship with the user's pupil 27 that is located on the front surface of the user's eyeball 22. The liquid crystal display 16 has a substantial conjugate relationship with the user's retina 24. Accordingly, the display device 1 has a deep focal depth, and therefore the displayed image will never appear out of focus. Also, confidentiality of the displayed image is enhanced.

Figure 4:
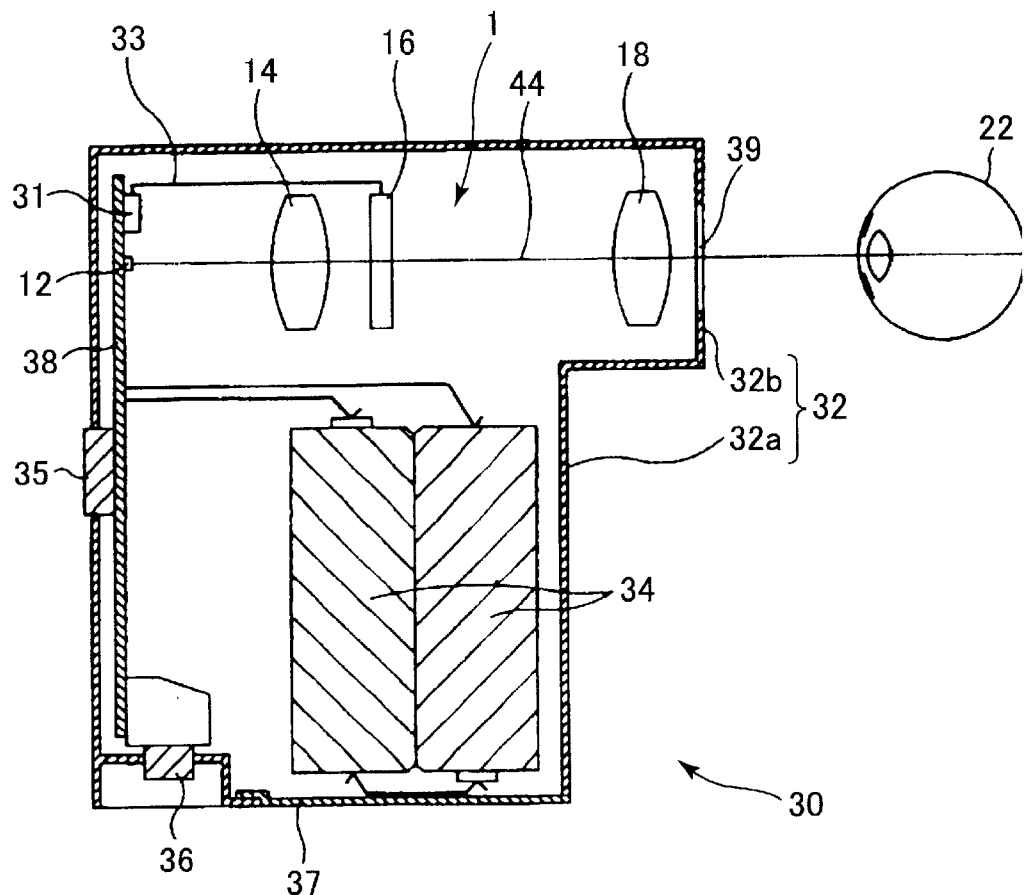
FIG. 4 is a schematic view showing a hand held type portable display that includes the display device of the first embodiment.
Figure 5:
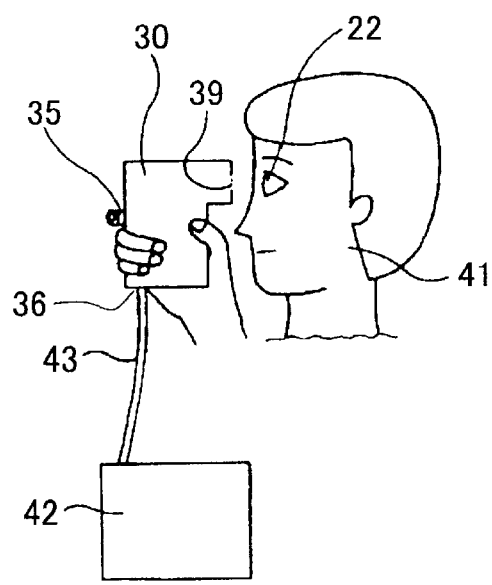
FIG. 5 is a schematic view showing how a user uses the hand held portable display of FIG. 4.

FIG. 4 is a schematic view showing configuration of a hand-held portable display that incorporates the display device 1 of the first embodiment. FIG. 5 is a schematic view showing how a user uses the hand-held portable display of FIG. 4.

As shown in FIG. 4, the hand-held portable display 30 has a casing 32 which includes a lower portion 32a and an upper portion 32b. The upper portion 32b houses the display device 1 of FIG. 2A therein. The lower portion 32a has a battery lid 37 and houses two AA type batteries 34 therein. The battery lid 37 can be removed from the lower portion 32a to replace the AA batteries 34 with new ones.

The lower portion 32a of the casing 32 has a shape and size to enable the user to easily grasp it in one hand as shown in FIG. 5. A power switch 35 is provided on the front surface of the lower portion 32a at a position that corresponds to the user's index finger when the user 41 grasps the lower portion 32a.

A video signal input connector 36 is provided to the lower surface of the lower portion 32a. As shown in FIG. 5, the video signal input connector 36 is connected to an image playing device, such as a DVD player 42, via a video cable 43.

A board 38 is mounted in the casing 32 to extend from the lower portion 32a to the upper portion 32b. A drive circuit (not shown) and a LCD connector 31 are mounted on the board 38. The drive circuit is for driving the liquid crystal display 16. The LCD connector 31 is connected to the liquid crystal display 16 via a LCD harness 33. The video signal inputted from the video signal input connector 36 is transferred to the liquid crystal display 16 through those components mounted on the board 38.

An image viewing window 39, in the form of an aperture, is provided on the upper portion 32b of the casing 32 at a position confronting the imaging lens 18. A transparent plate can be fitted to the window 39.

With the above-described structure, light emitted from the white LED 12 passes through the condenser lens 14, the liquid crystal display 16, the imaging lens 18, and the window 39, and finally focuses in the vicinity of the pupil of the user's eye 22. Thus, the user can view the displayed image through the window 39.

The user can hold the hand-held portable display 30 in one hand to view the displayed image at any desired locations such as outdoors. The upper portion 32b protrudes out from the lower portion 32a at the position where the window 39 is provided. With this configuration, as shown in FIG. 5, the user can easily view the image without his/her face bumping against the lower portion 32a when he/she brings his/her face close to the window 39.

The hand-held portable display 30 is the type for viewing with one eye, so has only a single display unit 1. For this reason, when the user is using the hand-held portable display 30, one eye picks up the image displayed by the liquid crystal display 16 and the other eye picks up the image of the surrounding area. Because the user cannot focus the right or left eye independent from the other eye, the user can focus only on the image he/she is consciously viewing when the images incident on his/her left and right eyes are different. Because the hand-held portable display 30 includes the display device 1 of the present embodiment, which has the characteristic of a long focal depth, the user will be able to view the image displayed by the liquid crystal display 16 without any shift in focus by nearly focusing on the image of the surrounding area. Therefore, the user can view clear images with both eyes without any lack of focus.

Because the white LED 12 which can be configured in a compact form is used as a point light source in the display 1, the hand-held portable display 30 can be made in a compact form overall. Because the white LED 12 consumes little power, it is sufficient to mount, as a power source, the AA batteries 34 which have a relatively small size and light weight. The hand-held portable display 30 can be formed in a desirable light and small portable form.

Although the above-described example is a hand-held portable display with only a single display device 1 for viewing images with one eye, the same configuration can be used for providing a hand-held portable display with two display devices 1 for viewing with both eyes.

When the two display devices 1 are incorporated in a hand-held portable display for viewing with both eyes, because the display device 1 has the feature of a long focal depth, the user can look through the window 39 directly after viewing the surrounding area, and can properly view the image on the liquid crystal display 16 without any problem of poor focus on the displayed image.

In the above-described example, the DVD player 42, which serves as an image player, is provided externally to the hand-held portable display 30. However, the image player 42 can be provided internally in the hand-held portable display 30 instead.

Figure 6:
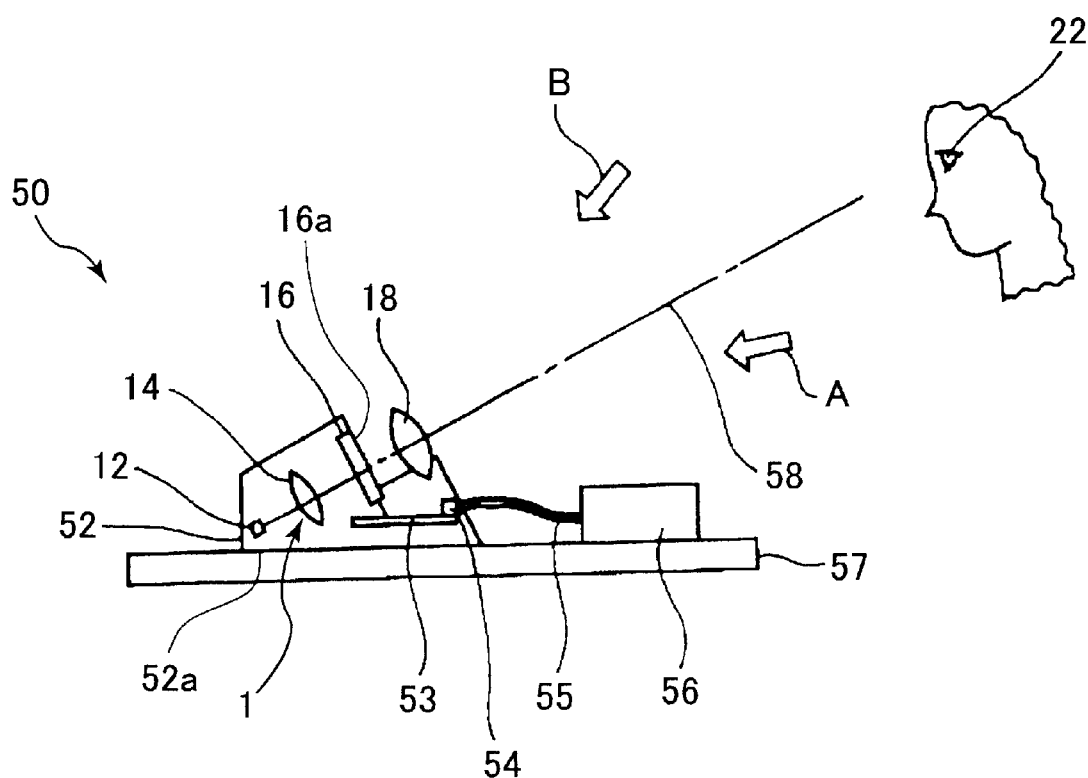
FIG. 6 is a schematic view showing a personal projector that includes the display device of the first embodiment.

FIG. 6 is a schematic view showing a configuration of a personal projector that incorporates the display device 1 of the present embodiment.

As shown in FIG. 6, the personal projector 50 has a casing 52. The casing 52 is provided with a flat bottom surface 52a to ensure stability when placed on a flat surface such as a table 57. It should be noted that the casing 52 need not be provided with a flat bottom surface but could instead be designed to be placed on a stable stand.

The white LED 12, the condenser lens 14, and the liquid crystal display 16 in the display device 1 are disposed within the casing 52 of the personal projector 50. Further, a control device 53 and a video signal input connector 54 are also disposed within the casing 52. The control device 53 is for controlling or driving the liquid crystal display 16. A DVD player 56 is connected to the video signal input connector 54 via a video cable 55.

The liquid crystal display 16 is supported on the casing 52 so that its display surface 16a is exposed external from the casing 52. The imaging lens 18 is located outside of the casing 52 in confrontation with the exposed surface 16a of the liquid crystal display 16.

With this construction, light emitted from the white LED 12 passes through the condenser lens 14, the liquid crystal display 16, and the imaging lens 18, to focus in the vicinity of the pupil of the user's eye 22 on the optical axis 58. As apparent from the drawing, the display device 1 is oriented with its optical axis 58 being slanted upward at an appropriate angle to facilitate viewing of the displayed image by the user. For this reason, the user can view at the displayed image while in a comfortable posture, such as sitting at a chair.

According to the present embodiment, the white LED 12, which can be configured in a small shape, is used as the point light source, so the entire personal projector 50 can be formed in a small size. Also, the white LED 12 consumes only slight amounts of power, so the amount of power consumed can be suppressed. For example, a small battery will be sufficient to operate the personal projector 50 as a result.

Further, because the focal depth of the display device is quite long, the displayed image will not be easily brought out of focus. Further, the displayed image can only be viewed at a position that is separated from the display device 1 along the optical axis 58. Therefore, displayed images can be concealed to a high degree. For example, the image displayed on the liquid crystal display 16 cannot be viewed from directions indicated by arrays A and B in the figure.

Figure 7A:
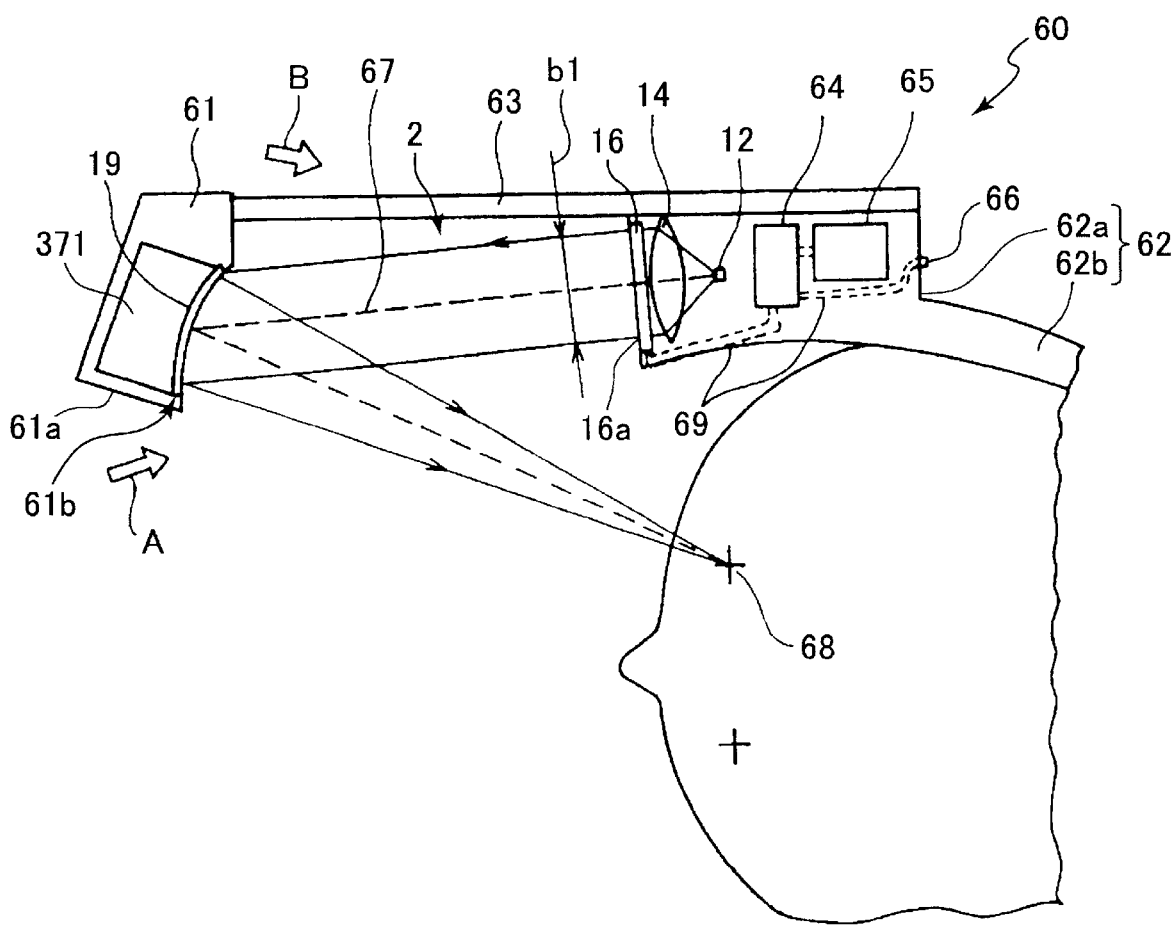
FIG. 7A is a schematic view showing a head mount display that includes a display device of a modification of the first embodiment.

FIG. 7A is an upper schematic view of a head mount display 60 that incorporates a display device 2 which is a modification of the display device 1 of the present embodiment.

Figure 7B:
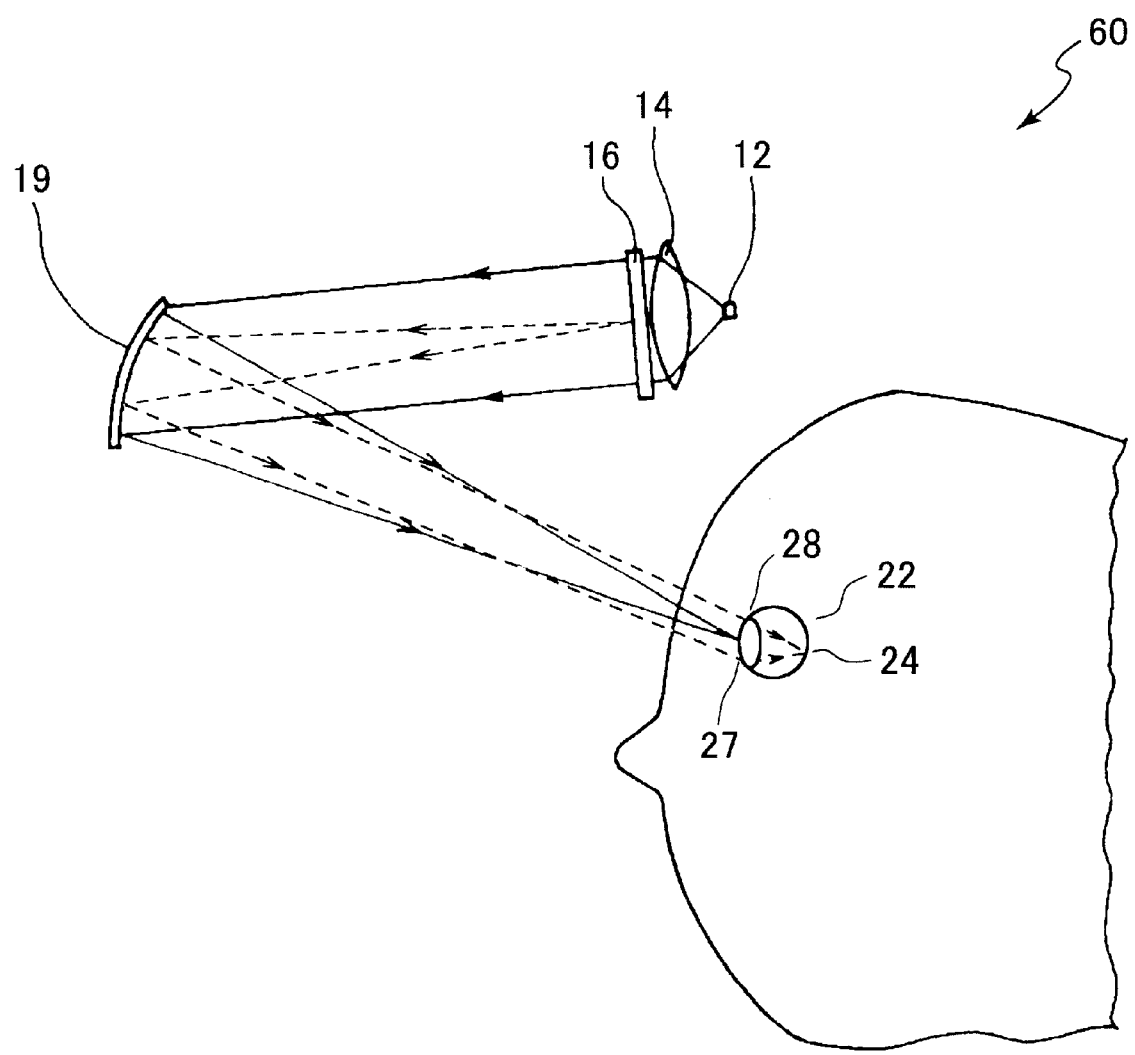
FIG. 7B is a schematic view illustrating an optically conjugate relationship between components in the head mount display of FIG. 7A.

The display device 2 is the same as the display device 1 except that the display device 2 has a concave mirror 19 instead of the imaging lens 18. In other words, the display device 2 has the white LED 12, the condenser lens 14, the liquid crystal display 16, and the concave mirror 19. The concave mirror 19 has a positive power similarly to the imaging lens 18. Contrary to the imaging lens 18 that transmits light therethrough, however, the mirror 19 reflects light. Thus, the mirror 19 operates to change the direction of the optical axis 67 from the liquid crystal display 16 in a direction toward the left or right eye of the user. Except for changing the direction of the optical axis 67, the concave mirror 19 functions in the same manner as the imaging lens 18, and therefore serves as an optical imaging system. That is, the concave mirror 19 is located at a position, as shown in FIG. 7B, to establish a substantial conjugate relationship between the white LED 12 and the user's pupil 27 and another substantial conjugate relationship between the liquid crystal display 16 and the user's retina 24.

As shown in FIG. 7A, the head mount display 60 has: a head fixing frame 62 fixing the entire head mount display 60 to the user's head, an attachment casing 61 detachably attaching the concave mirror 19 thereto; and a support bar 63 that extends from the head fixing frame 62 to support the attachment casing 61.

The head fixing frame 62 includes: a display casing 62a and a head support frame portion 62b formed integrally with the display casing 62a. The head support frame portion 62b is curved to follow the shape of the user's head to fix the entire head mount display 60 onto the head of the wearer. The head support frame portion 62b can be any suitable configuration, such as a hair band or helmet type configuration, as long as the entire head mount display 60 can be secured to the user's head so that the position of the attachment casing 61 will not change with respect to the wearer's head even when the wearer moves his/her head around.

The display casing 62a mounts therein: the white LED 12, the condenser lens 14, and the liquid crystal display 16 of the display device 2. The display casing 62a further mounts therein: a drive circuit 64 driving the liquid crystal display 16, a battery 65, and a video signal input connector 66. An image player, such as DVD player (not shown), is connected via a video cable (also not shown) to the video signal input connector 66. The video signal inputted to the video signal input connector 66 is supplied to the drive circuit 64 and the liquid crystal display 16 via cables 69.

The liquid crystal display 16 is supported in the display casing 62a so that its display surface 16a is exposed outside from the display casing 62a.

The attachment casing 61 has a wall 61a defining a hollow portion 371 therein. The wall 61a is formed with a recess or groove 61b. The concave mirror 19 is detachably supported on the attachment casing 61 by fitting it into the recess 61b so that the mirror 19 is directed toward the wearer's face when the head mount display 60 is set on the wearer's head. The mirror 19 can be removed from the attachment casing 61 by removing an upper lid (not shown) of the attachment casing 61.

With this structure, light emitted from the white LED 12 passes though the condenser lens 14 and then the liquid crystal display 16, thereby proceeding within a light beam bundle range b1 indicated in FIG. 7A. The light reflects off the concave mirror 19, and focuses in the vicinity of the eye point 68 of the user's left or right eye that is located on the optical axis 67. It is noted that the eye point 68 is defined as the position of the pupil when the eye faces directly forward.

By using the head mount display 60 with the above-described configuration, the user can view the displayed image at any desired locations, such as outdoors, while retaining both hands free.

The head mount display 60 can be formed in the small compact size because it uses the white LED 12 (point light source) that can be formed in a small shape. Also, the white LED 12 consumes only slight amounts of power, so the amount of power used by the head mount display 60 can be reduced. Also, the white LED 12 can be operated using small capacity, low voltage battery 65. Accordingly, the head mount display 60 can be formed in a light small shape with excellent portability.

Further, because the focal depth of the display device 2 is quite long similarly to the display device 1, the displayed image will not be easily brought out of focus. Further, the displayed image can only be viewed at a position that is separated from the display device 1 along the optical axis 67. Therefore, displayed images can be concealed to a high degree. For example, the image displayed on the liquid crystal display 16 cannot be viewed from directions indicated by arrays A and B in the figure.

Because the mirror 19 is provided to direct the optical axis 67 of the display device 2 toward the wearer's face, the essential portion of the display device 2 can be disposed within the display casing 62b. For this reason, the attachment casing 61 can be formed in a compact shape, blocking little part of the field vision of the wearer.

Figure 8:
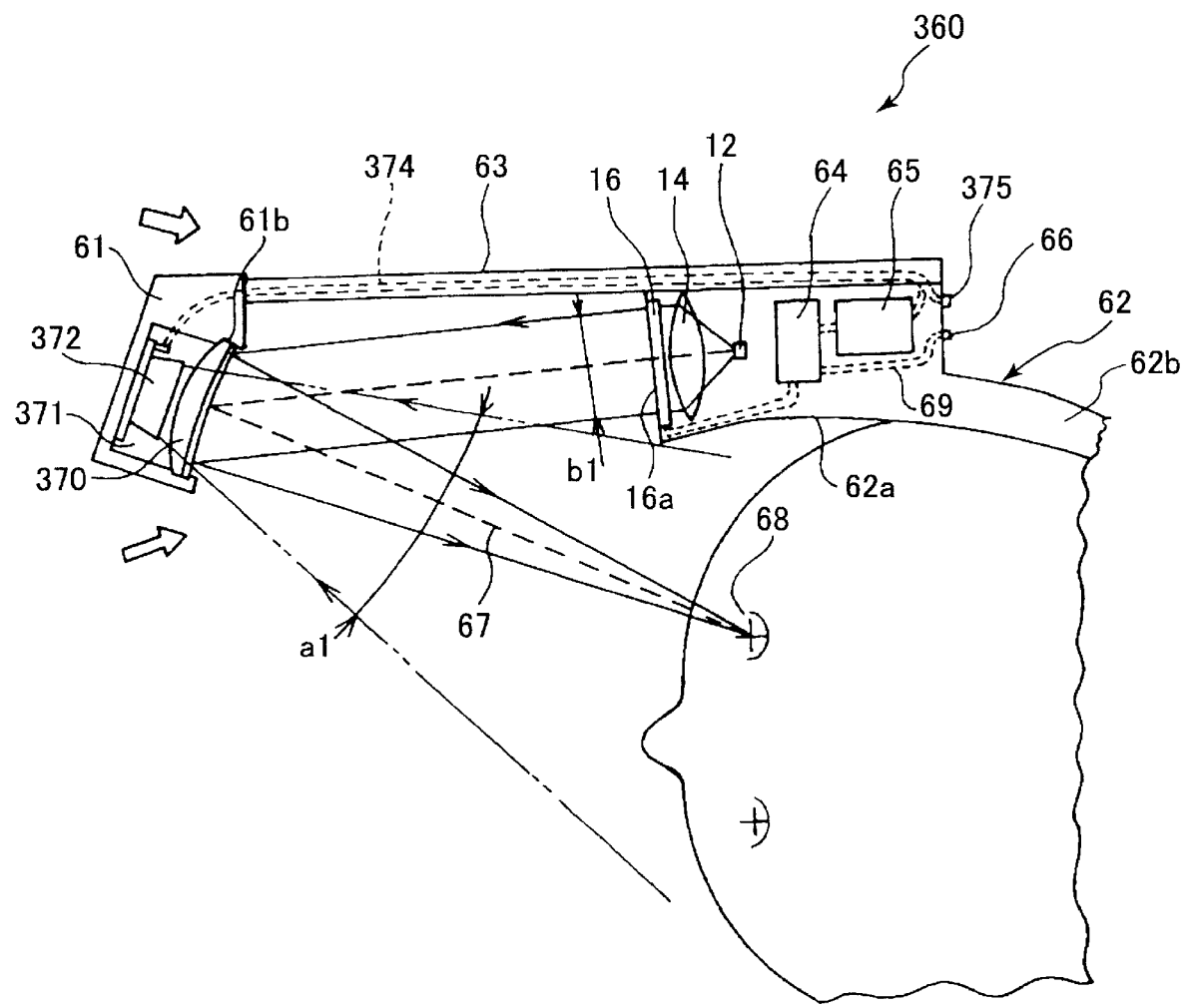
FIG. 8 is a schematic view showing a head mount display camera that includes a display device of another modification of the first embodiment.

FIG. 8 is an upper schematic view of a head mount display camera 360 according to a modification of the head mount display 60.

This head mount display camera 360 is the same as the head mount display camera 60 except that a half mirror 370 is mounted in the attachment casing 61 instead of the mirror 19 and that a CCD camera 372 is mounted in the attachment casing 61. More specifically, the half mirror 370 is inserted into the recess 61b of the attachment casing 61. The half mirror 370 can be removed from the attachment casing 61 by removing the upper lid (not shown) of the attachment casing 61. When the upper lid and the half mirror 370 are properly set to the attachment casing 61, the hollow portion 371 serves as a dark chamber or dark box.

The CCD camera 372 is mounted within the hollow portion (dark chamber) 371 in an orientation facing the face of the wearer with the same view point as the half mirror 370. In other words, the CCD camera 372 is mounted so that the CCD camera 372 will pick up the user's face along an optical axis that is the same as the optical axis 67, along which the user views the half mirror 370.

Because the half mirror 370 covers the CCD camera 372 in the dark chamber 371, the CCD camera 372 cannot be seen from the outside of the dark chamber 371.

A cable 374 from the CCD camera 372 passes through the support bar 63 and connects with an output connector 375 which is provided at the end of the display casing 62b.

The CCD camera 372 has an image pickup range a1 to pick up the entire face of the wearer. The image pickup range a1 is determined by the optical power of the optical transmitting characteristic of the half mirror 370. The image pickup range a1 is set to a range, wherein the display casing 62a, in particular, the liquid crystal display 16 does not fall in the range of the image pickup range a1.

The structure of the half mirror 370 will be described below in greater detail with reference to FIG. 9.

The half mirror 370 includes: a lens portion 381, formed from an optical resin, for example, and a reflective surface 382 formed on one surface of the lens portion 381. The reflective surface 382 can be formed from aluminum deposition, for example, provided on the lens portion 381. The half mirror 370 has a reflectivity of 20% or greater and 90% or less and a transmittance of 10% or greater and 80% or less.

Figure 9:
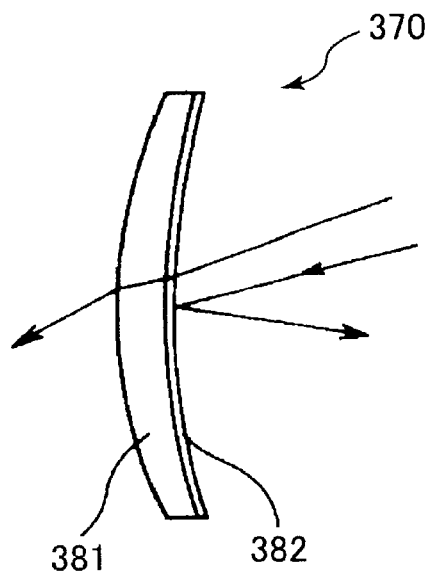
FIG. 9 is a schematic cross-sectional view showing a structure and an operation of a half mirror employed in the head mount display camera of FIG. 8.

In the example shown in FIG. 9, the lens portion 381 is formed from a convex lens wherein a center portion is thick and peripheral portions are thinner, so that the reflective surface 382 forms a concave mirror. Because of the convex lens shape, the lens portion 381 has the positive power to converge an incident light bundle. The half mirror 370 can therefore shorten the focal length of the CCD camera 372 to allow the CCD camera 372 to pick up the user's face with a wider angle of view. Because of the concave mirror shape, the mirror surface 382 has also the positive power to converge the incident light bundle. The half mirror 370 can show the user a magnified or enlarged view of the liquid crystal display screen 16a using the magnifier effect of the concave mirror shape. Thus, the half mirror 370 has both of a reflection function and a function equivalent to a convex lens.

The half mirror 370 having the above-described function is located, similarly to the mirror 19, as shown in the head mount display 60 of FIG. 7B, so as to establish a substantial conjugate relationship between the white LED 12 and the user's pupil and another substantial conjugate relationship between the liquid crystal display 16 and the user's retina.

In the head mount display camera 360 having the above-described structure, similarly to the head mount display 60 of FIGS. 7A and 7B, light emitted from the white LED 12 passes through the condenser lens 14 and then the liquid crystal display 16, thereby proceeding within the light beam bundle range b1 indicated in FIG. 8. The light reflects off the half mirror 370, and focuses in the vicinity of the eye point 68 of the user's left or right eye on the optical axis 67. The CCD camera 372 picks up the image of the wearer's face.

Figure 10:
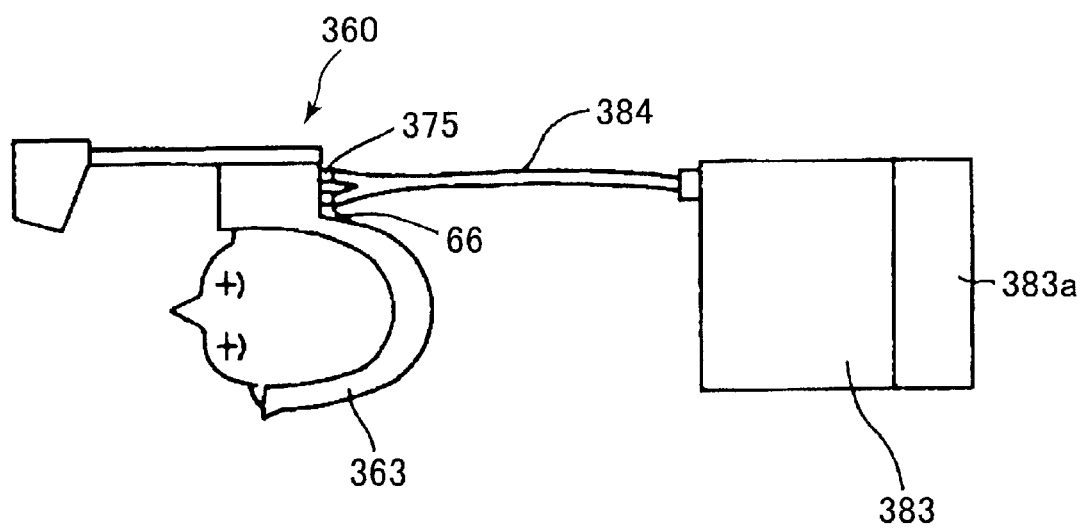
FIG. 10 is a schematic view showing how the head mount display camera of FIG. 8 is used.

FIG. 10 shows an example how the head mount display camera 360 is used. A video connector 384 of a mobile computer 383, which mounts a battery 383a therein, is connected to the input/output connectors 66 and 375. Images picked up by the CCD camera 372 are recorded in a recording device in the mobile computer 383. Images from a player in the mobile computer 383 are outputted to the liquid crystal drive circuit 64. When the mobile computer 383 is of a type that can be connected to a telephone circuit performing communications with remote communication machines, then the mobile computer 383 functions to transmit image information pickup up by the CCD camera 372 and to receive image information to be displayed on the liquid crystal display 16.

The wearer can use the head mount display camera 360 regardless of his or her location by mounting the head mount display camera 360 on his/her head and connecting it to the mobile computer 383. The head mount display camera 360 is very versatile and can cope with a variety of different uses by the wearer. For example, if the wearer wears the head mount display camera 360 while sitting in a seat in a train, not only does the head mount display camera 360 functions to display his/her desired image information to the wearer, but also functions to pickup the image of his/her face.

As shown in FIG. 8, the CCD camera 372 is housed within the dark chamber 371 covered by the half mirror 370. Accordingly, when the wearer controls the CCD camera 372 to pick up his/her face, the wearer will not be conscious with the existence of the CCD camera 372.

The half mirror 370, which directs the optical axis 67 toward the wearer's face, is provided between the CCD camera 372 and the user's face. Because the CCD camera 372 and the half mirror 370 are thus arranged in a cascade manner, the essential portion of the display device 2 can be disposed within the display casing 62a. In particular, the CCD camera 372 and the half mirror 370 are aligned in the same point of view as the wearer. In other words, the user's eye views the half mirror 370 along the optical axis 67, and the CCD camera 372 picks up the user's face along the same optical axis 67. For this reasons, the attachment casing 61 can be formed in a compact shape, blocking little part of the field vision of the wearer.

The liquid crystal display 16 does not fall into the image pickup range a1 of the CCD camera 372, so that the CCD camera 372 will not pick up unnecessary images of the display 16 and also will not have undesirable exposure problems. That is, if the liquid crystal display 16 falls within the image pickup range a1, the CCD camera 372 will adjust its exposure amount to compensate for the brightness of light from the liquid crystal display 16. As a result, the wearer's face will become darken. The configuration of the present modification will, however, prevent such problems from happening.

It is noted that a separate reflecting mirror 19 can be additionally provided either above or below the half mirror 370 in the attachment casing 61. This additional reflecting mirror 19 is used exclusively for reflecting the displayed image from the liquid crystal display 16, as defined by the light bundle range b1, to the wearer's eye in the same manner as the mirror 19 in the head mount display camera 60. In this case, the half mirror 370 is used exclusively to reflect the wearer's face, as defined by the image pickup range a1, back to the wearer. With this configuration, the half mirror 370 can be used exclusively for the image pickup operations and can reflect the wearer's face back to the wearer so that the wearer can confirm his or her expression, for example, that is being pickup up by the CCD camera 372.

It is noted that the entire display device 2 can be mounted either above, below, left, or right from the CCD camera 372 in the attachment casing 61. In this case, there is no possibility that the display device 2 will fall within the image pickup range a1 of the CCD camera 372.

In the above-describe example, both of the lens portion 381 and the mirror portion 362 in the half mirror 370 have the positive power to converge incident light. However, it is unnecessary that both of the lens portion 381 and the mirror portion 362 have the positive power. For example, the lens portion 381 may have a concave lens shape with a negative power to diverge the incident light bundle. In this case, the focal length is lengthened, and so the half mirror 370 can provide a telescopic image of the display image to the wearer. Or, the lens portion 381 may have a parallel flat lens shape. In this case, the lens portion 381 has no power to change the divergent or convergent degree of the incident light. Similarly, the mirror portion 382 may have a convex mirror shape with a negative power to diverge the incident light bundle. Or, the mirror portion 382 may have a flat mirror form. In this case, the mirror portion 382 has no power to change the divergent or convergent degree of the incident light. By determining the powers of the lens portion 381 and the mirror portion 382 independently, the lens portion 381 and the mirror portion 382 can be designed to perform their suitable functions, respectively. It is, however, preferable that at least one of the lens portion 381 and the mirror portion 382 have positive or negative power. In other words, it is preferable that the half mirror 370 have optical power in at least one of its light reflecting characteristic and its light transmitting characteristic.

Although not shown in FIG. 8, one or more lenses may additionally be provided between the liquid crystal display 16 and the half mirror 370. The additional lenses and the half mirror 370 cooperate to serve as an optical imaging system for forming the displayed image onto the user's eye. For example, a convex lens may be provided as the additional lens. In this case, the convex lens shortens the focal length of the half mirror 370, thereby widening the display image. Or, a concave lens may be provided as the additional lens. In this case, the concave lens lengthens the focal length of the half mirror 370, thereby providing a telescopic image of the display image. Thus, it is possible to switch between display of a widened image and display of a telescopic image by switching between insertion of the additional convex lens and insertion of the additional concave lens. It is also possible to switch between display of a widened image and display of a telescopic image by switching between use of a half mirror 370 with the convex lens portion 381 and use of another half mirror 370 with the concave lens portion 381.

Figure 11:
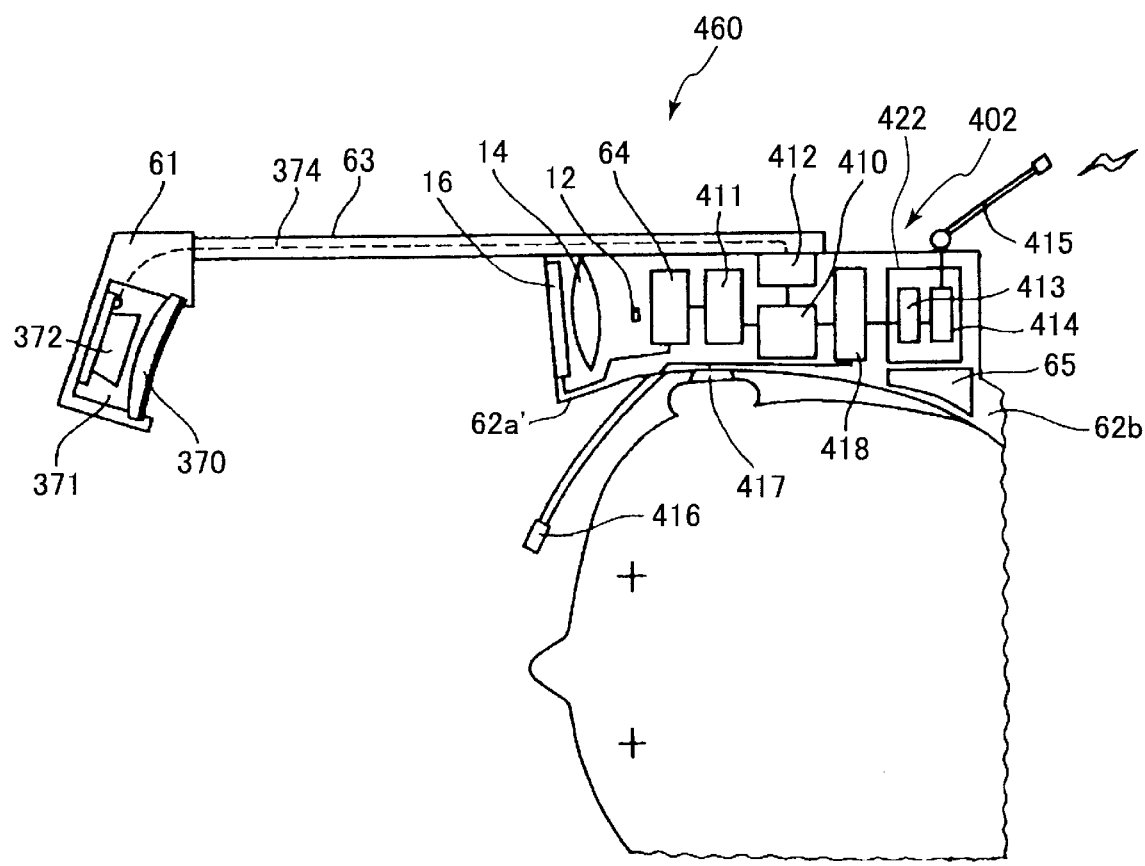
FIG. 11 is a schematic view showing a modification of the head mount display camera of FIG. 8.

FIG. 11 is an upper schematic view of a modification of the head mount display camera 360.

The head mount display camera 460 of this modification differs from the head mount display camera 360 of FIG. 8 in that it has a longer display casing 62a' than the display casing 62a in the head mount display camera 360 and that a communication unit 402 is further mounted in the display casing 62a'.

The communication unit 402 includes: a central processing unit (CPU) 410, a MPEG moving picture decompressor (decoder) 411, a MPEG moving picture compressor (encoder) 412, a call reception unit 418, and a transmission unit 422. The entire communication unit 402 is mounted in the display casing 62a'.

The MPEG moving picture decompressor (decoder) 411 is connected to the liquid crystal display drive circuit 64, while the MPEG moving picture compressor (encoder) 412 is connected to the CCD camera 372. Both of the decoder 411 and the encoder 412 are connected to the CPU 410.

The transmission portion 422 is configured from: an antenna 415, a MODEM (modulator/demodulator) 414, and a power amplifier 413, which is in turn connected to the call reception device 418.

A microphone 416 and a speaker 417 are attached to the display casing 62a'. The microphone 416 is for inputting a wearer's voice. The speaker 417 is for outputting a remote person's voice into the wearer's ear. Both of the microphone 416 and the speaker 417 are connected to the call reception device 418. The call reception device 418 is connected both to the CPU 410 and to the transmission portion 422. The battery 65, mounted in the display casing 62a', supplies power to the entire head mount display camera 460.

With the above-described structure, image information picked up by the CCD camera 372 is encoded by the MPEG encoder 412 and wirelessly transmitted, via the transmission portion 402, to remote communication machines. Image information is also wirelessly received by the transmission portion 402 from remote communication machines, and decoded by the MPEG decoder 411 and displayed by the liquid crystal display 16. Voices are communicated also with the remote communication machines while images are thus being communicated with the remote communication machines.

Because the head mount display camera 460 is provided with the transmission portion 402, there is not need to provide a cable, such as a video connector, for connecting the head mount display camera 460 to a mobile computer as shown in FIG. 10. Because there is no cable, the cable is not given in the wearer's way when the wearer moves his/her head, for example. The wearer can use the head mount display camera 460 while on his/her moves.

Because the transmission portion 402 is compactly housed within the display casing 62a', the head mount display camera 460 is sufficiently compact to be used on a wearer's head. Because transmission and reception of compressed image data is performed using the MPEG decoder 411 and the MPEG encoder 412, the head mount display camera 460 is capable of functioning as a television telephone to communicate voices and moving pictures with remote locations using a relatively slow data transmission rate of about 64 kbps.

Next, a second embodiment of the present invention will be described with reference to FIGS. 12 through 34B.

Figure 12:
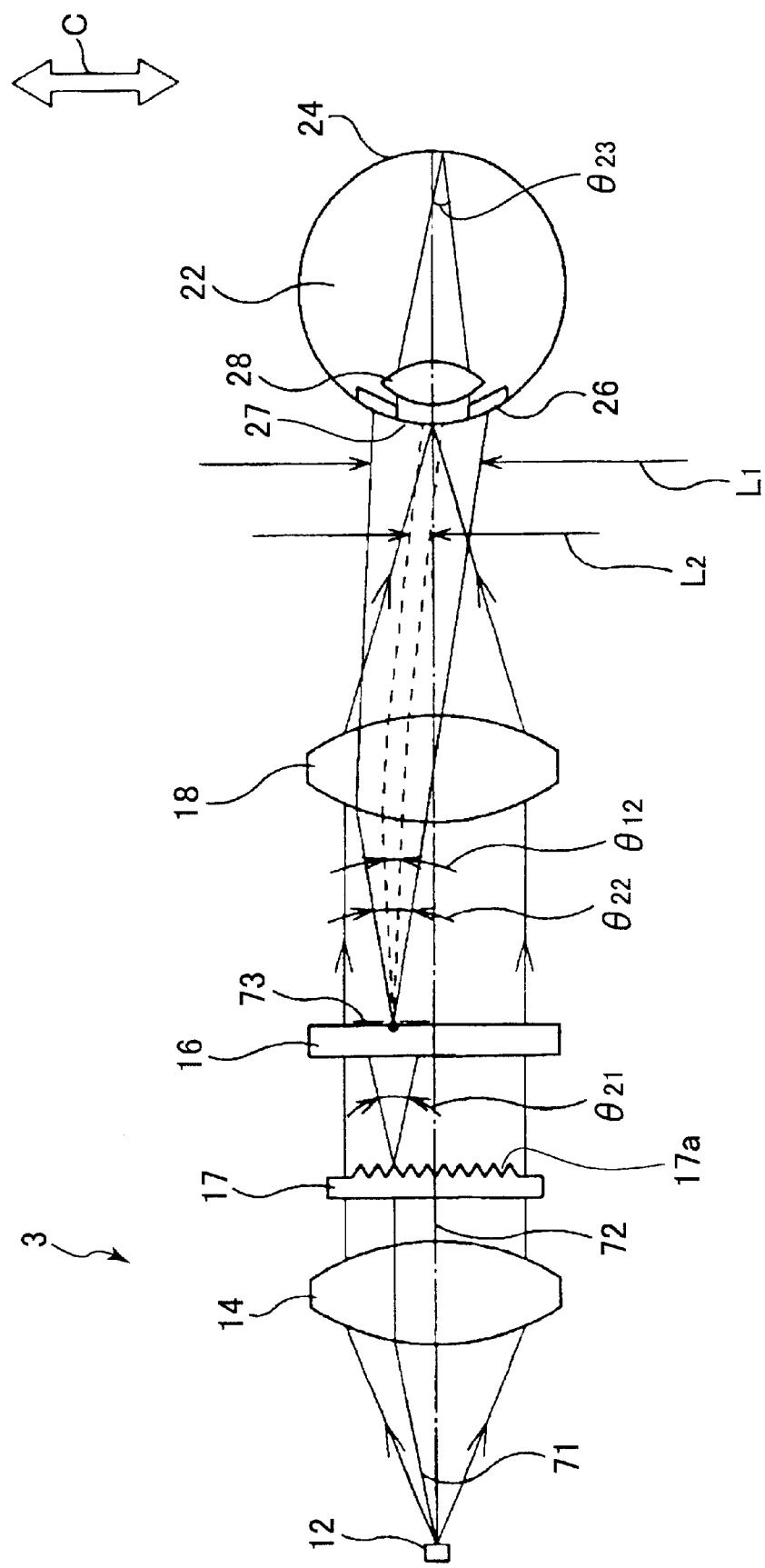
FIG. 12 is a schematic view showing a display device according to a second embodiment of the present invention.

FIG. 12 is a schematic view showing a display device according to the present embodiment. The display device 3 of the present embodiment is the same as the display device 1 of the first embodiment except that a scattering plate 17 is additionally provided. In other words, the display device 3 includes: the white LED 12, the condenser lens 14, the scattering plate 17, the liquid crystal display 16, and the imaging lens 18. The scattering plate 17 is for scattering light gathered by the condenser lens 14.

It is noted that the scattering plate 17 can be positioned at an optional position between the white LED 12 and the liquid crystal display 16. In the example of FIG. 12, the scattering plate 17 is located between the condenser lens 14 and the liquid crystal display 16. However, the scattering plate 17 may be located between the white LED 12 and the condenser lens 14.

In the same manner as the first embodiment, the imaging lens 18 is disposed to provide a substantial conjugate relationship between the white LED 12 and the pupil 27 of the user's eye 22 and another substantial conjugate relationship between the liquid crystal display 16 and the retina 24 of the user's eye. Because the white LED 12 and the pupil of the user's eye 22 are in the conjugate relationship with each other, as described in the first embodiment, power consumed by the white LED 12 can be suppressed. Because the liquid crystal display 16 and the retina 24 of the user's eye are in the conjugate relationship with each other, as also described in the first embodiment, light modulated by and emitted from the liquid crystal display 16 forms an image on the user's retina 24. The user can therefore view images formed by light modulated by the liquid crystal display 16.

Figure 13A:
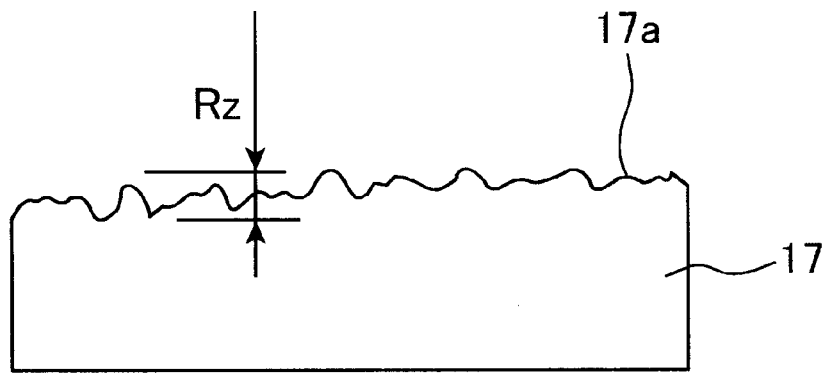
FIG. 13A is a schematic view illustrating a surface roughness of a scattering plate employed in the display device of the second embodiment.

The scattering plate 17 is formed from a transparent material, such as acryl, glass, PMMA (polymethyl methacrylate), or polycarbonate (PC). As shown in FIG. 13A, one surface 17a of the scattering plate 17 that faces the liquid crystal display 16 is formed with unevenness whose surface roughness Rz is greater than the wavelength of visible light. For example, the surface roughness Rz is about 0.5 to 10 μm. It is noted that the surface roughness Rz is defined as the difference between the highest and lowest positions in the unevenness of the surface 17a.

The scattering characteristic of the scattering plate 17 can be adjusted by changing the shape and the surface roughness of the unevenness on the surface 17a. In this example, the scattering plate 17 is made from an acryl transparent plate, whose surface 17a is subjected to a surface treatment, such as a machining process (grinding process) or a chemical process (etching process), to have the surface roughness Rz of 0.5 to 10 μm. With this configuration, the scattering plate 17 is designed to scatter incident light with luminous intensity distribution indicated by a characteristic formula of $I(\theta) = \cos^n \theta$ where n=3.

Having the scattering plate 17, the display device 3 operates as described below.

For the purpose of explanation, it will be assumed that an imaginary stop or diaphragm 73 is provided on the liquid crystal display 16 at a single point as shown in FIG. 12. The imaginary stop 73 is not actually provided.

Light is emitted from a single point of the white LED 12 and is aimed at the single point of the liquid crystal display 16 as indicated by the optical path 71 in FIG. 12. The light is collected by the condenser lens 14 to follow parallel with the optical axis 72 of the display device 3. The light then falls incident on the single point on the scattering plate 17. The light is scattered by the unevenness on the surface 17a of the scattering plate 17, and forms a divergent optical bundle that diverges with a divergent angle $\theta 21$.

A part of the light, that has emitted from the scattering plate 17, is then modulated at the single point on the liquid crystal display 16, and emits from the single point of the liquid crystal display 16 an at angle of emission $\theta 22$. It is noted that the emission angle $\theta 22$ is greater than the emission angle $\theta 12$ that is attained in the first embodiment (FIG. 2A) where no scattering plate 17 is provided. In FIG. 12, the emission angle $\theta 12$ is shown by a broken line.

In the first embodiment where no scattering plate 17 is provided, light emitted from the liquid crystal display 16 at the small emission angle $\theta 12$ forms a light beam bundle, whose width L2 at the front surface of the user's eye 22 is narrower than the diameter of the user's pupil. Accordingly, the focal depth is enhanced, and confidentiality is also enhanced because people, other than the user who is located on the optical axis, cannot view the displayed image. Because the light bundle width L2 itself is narrower than the width of the user's pupil, however, if the user moves his/her eye 22 only slightly by the distance of 0.5 mm, for example, normal to the optical axis 72 as indicated by the arrow C in FIG. 12, the light beam bundle that has been modulated at the single point on the liquid crystal display 16 will no longer fall incident on the pupil 27. For this reason, intensity variation will appear in the displayed image as the user moves his/her eye normal to the optical axis 67.

Contrarily, according to the present embodiment, the light emitted from the liquid crystal display 16 at the greater emission angle $\theta 22$ forms a light beam bundle, whose bundle width L1, on the front surface of the user's eye 22, is greater than the diameter of the pupil 27 and is almost equal to that of the iris 28 (about 10 mm). Accordingly, even when the user's eye 22 is moved slightly by the distance of 5 mm, for example, normal to the optical axis 72 as indicated by the arrow C, the light bundle will fall incident into the eye as long as the pupil is within the range indicated by L1 so that the light will form an image on the retina 24 after passing through the crystalline lens 28. For this reason, there will be relatively little variation in the intensity of the displayed image even when the user moves his/her eye normal to the optical axis 72. As apparent from the above explanation, by disposing the scattering plate 17 between the condenser lens 14 and the liquid crystal display 16, the intensity variation of the displayed image that accompanies with movement of the user's eye 22 can be suppressed.

Next, the desired scattering characteristics of the scattering plate 17 will be described in greater detail.

Figure 13B:
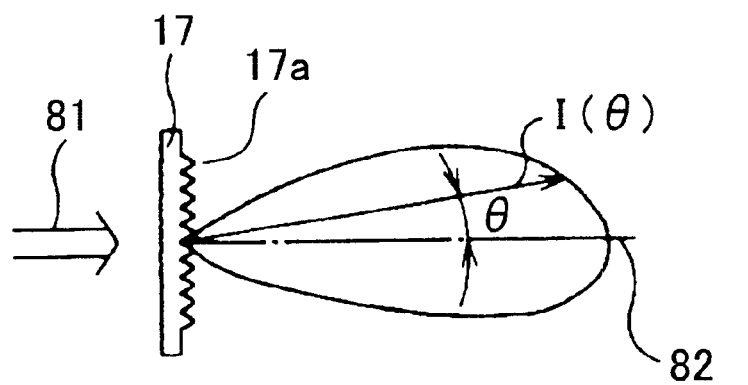
FIG. 13B is a schematic view illustrating a desirable scattering characteristic of the scattering plate.

As shown in FIG. 13B, luminous intensity distribution attained by the scattering plate 17 is approximately represented by the formula $I(\theta) = \cos^n \theta$ where $\theta$ is an angular deviation from the normal line of the scattering plate 17. I represents the luminous intensity indicated by unit candelas, and n is the coefficient depending on the surface form of the scattering plate 17. This formula shows that when parallel light 81 falls incident on the single point of the scattering plate 17, as shown in FIG. 13B, luminous intensity in a direction that is shifted by the angle $\theta$ from the normal line 82 of the scattering plate 17 is represented by $\cos^n \theta$.

Figure 14:
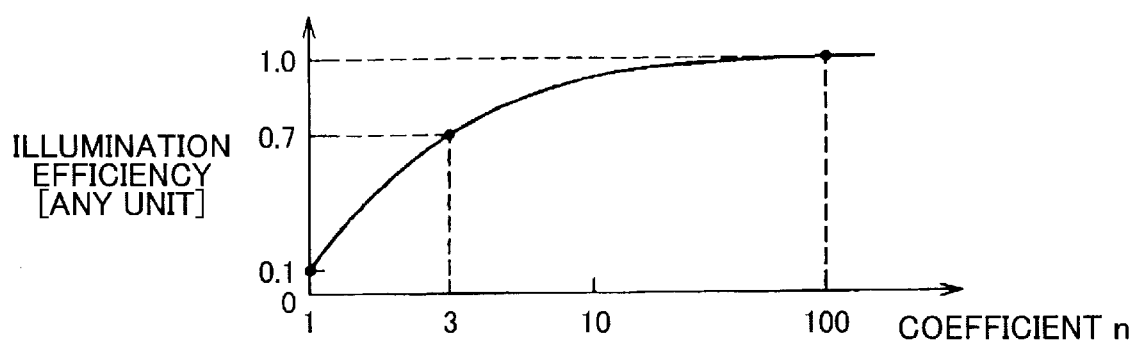
FIG. 14 is a graph showing a relationship between an illumination efficiency and a coefficient n, which is from a formula that represents luminous intensity distribution of the scattering plate.

FIG. 14 shows changes in illumination efficiency according to changes in coefficient "n". The illumination efficiency is defined as a ratio of the amount of light that is finally guided into the pupil with respect to the total amount of light that has originally emitted from the white LED 12. As apparent from FIG. 14, the illumination efficiency increases with increase in the coefficient n, but the rate of increase decreases with increase in the coefficient n. Once the coefficient n exceeds three (3), the degree of increase becomes extremely slight. Therefore, for the purpose of illumination efficiency, it is desirable that the coefficient n be as large as possible. However, for practical purposes, it is desirable that the coefficient n be three or greater.

Figure 15:
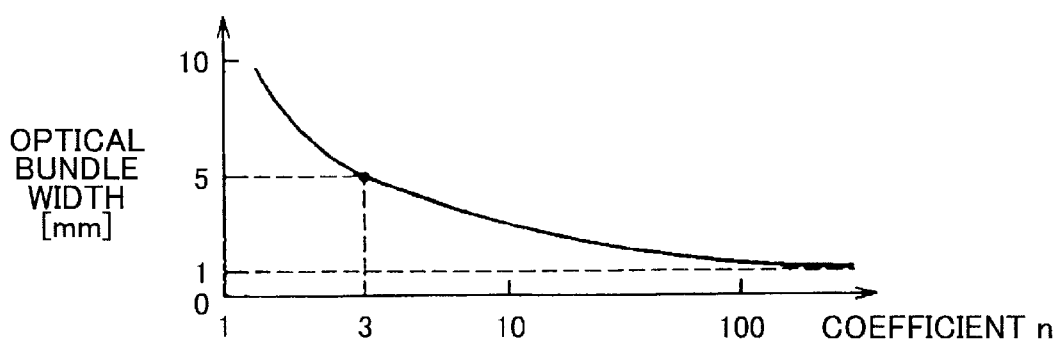
FIG. 15 is a graph representing a relationship between the coefficient n and a light bundle width at a position of the user's pupil.

FIG. 15 shows changes in light bundle width L1 at the position of the pupil according to the changes in coefficient "n". The light bundle width L1 is defined as the width (in millimeters) of spread, at the front surface of the user's eye 22, of light that has been emitted from the single point of the liquid crystal display 16 and that has passed through the scattering plate 17. As apparent from FIG. 15, the light bundle width decreases in association with increase in the coefficient n. However, the rate of decrease decreases in association with increase in the coefficient n. Once the coefficient n reaches 100, the light bundle width approaches about 1 mm. Because the smallest diameter for a human pupil is about 1 mm in diameter, if the light bundle width becomes smaller than 1 mm, the above-described effects derived from using the scattering plate 17 will not be attained. For this reason, it is desirable that the coefficient n be 100 or less.

By taking both the illumination efficiency and the light bundle width into consideration, it is desirable that the coefficient n be greater than or equal to three (3) and lower than or equal to 100. With coefficient n satisfying this relationship of $3 \leq n \leq 100$, it is possible to maintain, as greater than or equal to a predetermined minimum limit, the overall size of the view area where no variation in intensity occurs, while maintaining the illumination efficiency at the allowable illumination efficiency (0.7) or greater.

As described above, also in the present embodiment, the point light source 12 and the user's pupil 27 have the substantial conjugate relationship. Accordingly, regardless of the scattering plate 17, a large part of the light that has passed through the condenser lens 14 can be guided into the user's eyeball 22 through the pupil 27. Accordingly, the point light source 12 needs only to have a smaller light emitting power in order to irradiate the interior of the pupil with a fixed amount of optical power. It is therefore possible to suppress the power consumed by the point light source 12. Because the spatial light modulator 16 and the retina 24 have the substantial conjugate relationship, light modulated by the spatial light modulator 16 can be observed by the user.

Because the point light source 12 and the condenser lens 14 are used similarly to the first embodiment, although depending on the coefficient n of the scattering plate 17, the emission angle $\theta 22$, at which light emits from the single point on the liquid crystal display 16, can be made relatively small. Accordingly, the converging angle $\theta 23$, at which light focuses to form an image on the focal point on the retina 24, can be made relatively small. Thus, also in the display device 3 of the present embodiment, the focal depth of light forming an image will almost never appear out of focus even when there occurs a focal shift in the optical axis direction. Accordingly, the user can view clear images ordinarily without any means to adjust the focus of the device.

Also, according to the present embodiment, the emission angle θ22, at which light emits from the single point on the liquid crystal display 16, is relatively small although depending on the coefficient n of the scatting plate 17. Accordingly, almost none of the emitted light will reach people other than the user who is located on the optical axis 72 of the display device 3. Accordingly, even when the liquid crystal display 16 is exposed to the outside, the image displayed on the liquid crystal display 16 will almost never be seen by someone other than the user so that the displayed image can be kept extremely confidential. It is noted that these effects of the long focal depth and the high image confidentiality increase with increase of coefficient n.

Figure 16:
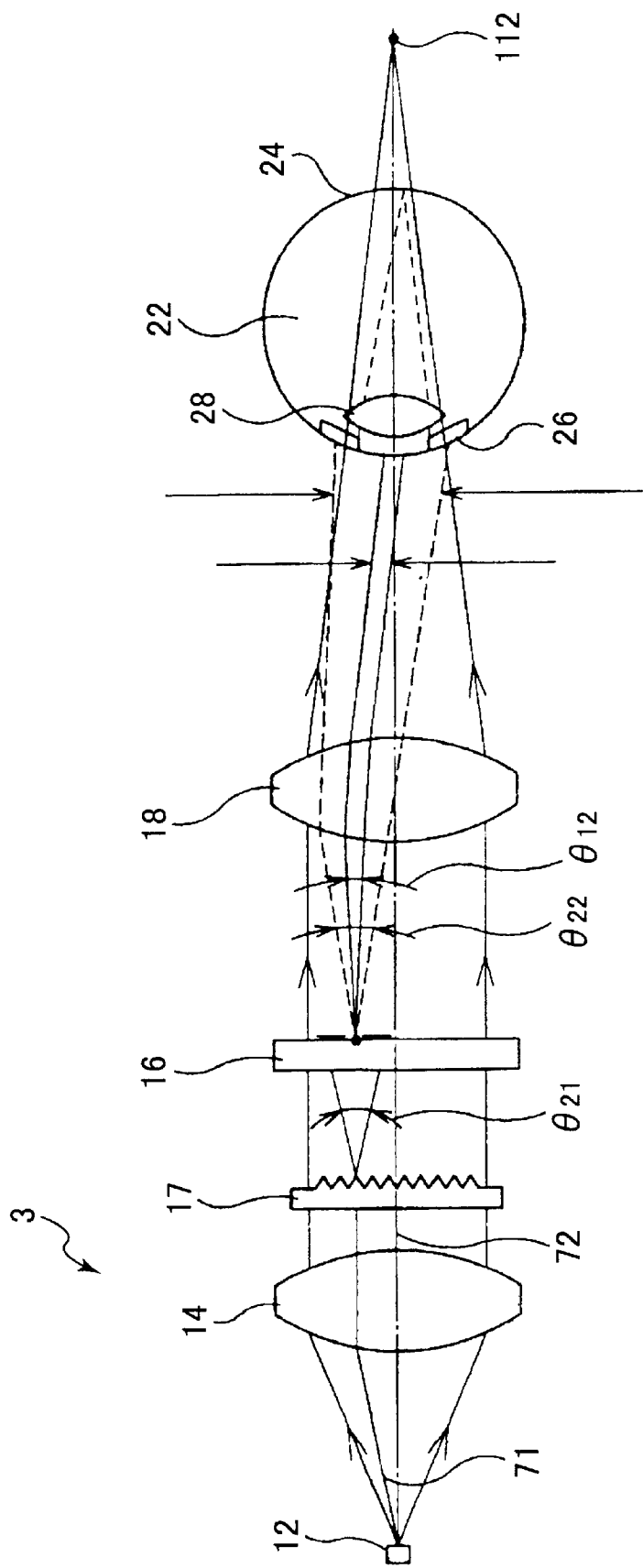
FIG. 16 is a schematic view showing a display device according to a modification of the second embodiment.

It is unnecessary that the white LED 12 and the user's pupil have the substantial conjugate relationship with each other. It is sufficient that only the liquid crystal display 16 and the user's retina have the substantial conjugate relationship with each other. FIG. 16 is a schematic view showing a display device according to this modification of the second embodiment. The display device 4 of this modification has the same configuration as the display device 3 except that the imaging lens 18 is disposed at a position different from the imaging lens 18 in the display device 3. Accordingly, the display device 4 of this modification can achieve the same advantages as the display device 3, such as suppression of variation in the intensity attained by the scattering plate 17 and suppression of poor focus of the displayed image.

According to this modification, the imaging lens 18 is positioned differently from the position of the imaging lens 18 in the second embodiment so as to lose the conjugate relationship between the white LED 12 and the pupil of the user's eye 22, while maintaining the conjugate relationship between the liquid crystal display 16 and the retina 24. The white LED 12 is in a conjugate relationship with a point 112 which is slightly behind the retina 24. For this reason, a portion of light that passes through the liquid crystal display 16 is shut out by the iris 26. Accordingly, there is a portion of the liquid crystal display 16 that cannot be observed. The white LED 12 has to be designed to emit light with power greater than the white LED 12 in the second embodiment. However, because the liquid crystal display 16 and the retina 24 are still in the conjugate relationship, at least a portion of the image from the liquid crystal display 16 can be observed.

In this example, the conjugate relationship between the LED 12 and the pupil of the user's eye 22 is lost by changing the position of the imaging lens 18 from that of the second embodiment. However, this conjugate relationship can be lost by moving any single one of the white LED 12, the condenser lens 14, and the liquid crystal display 16, or by moving more than one of these elements including the imaging lens 18. Alternatively, the conjugate relationship can be lost by the user moving him/herself.

As described above, according to the present embodiment, the scattering plate 17 is provided in order to broaden the bundle width L1 of the light in the vicinity of the user's pupil 27. It is therefore ensured that light can be guided into the user's eyeball 22 through the pupil 27 even when the user's eyeball 22 slightly shifts in a direction normal to the optical axis of the display device. Accordingly, there will be little variations in the intensity of the displayed image even when the user's eyeball moves normal to the optical axis.

Figure 17:
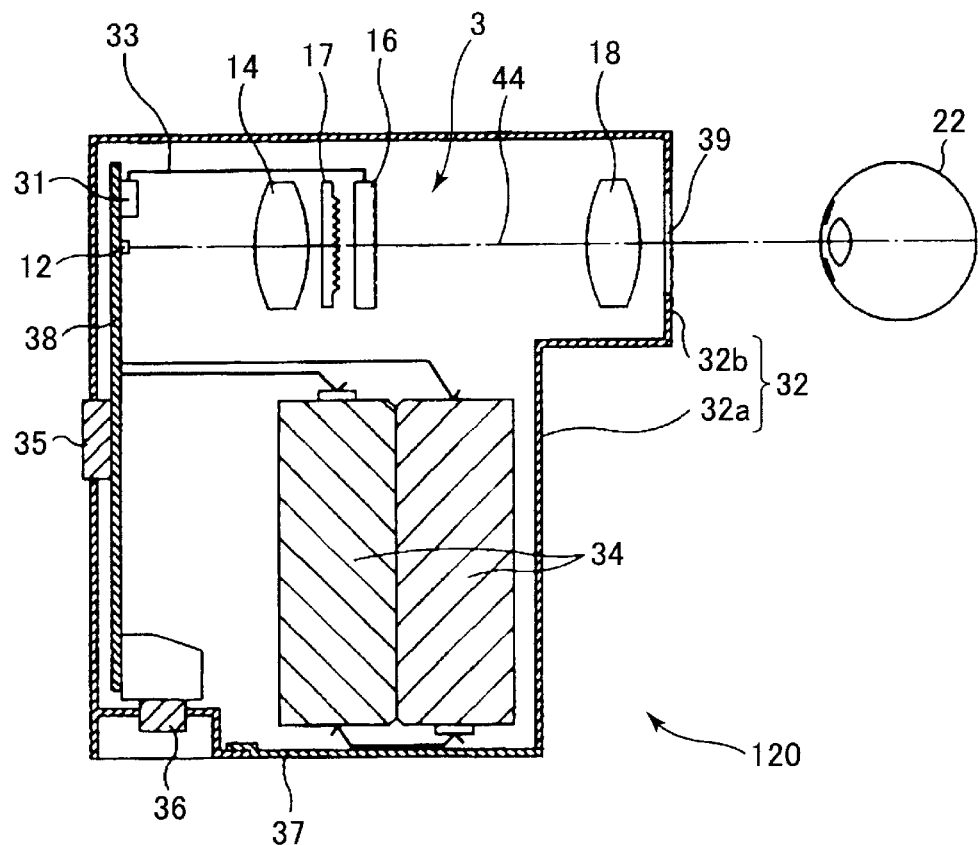
FIG. 17 is a schematic view showing a hand held portable display that includes the display device of the second embodiment.

FIG. 17 is a schematic view showing a hand held portable display 120, in which the display device 3 of the present embodiment is incorporated. Other components of the hand-held portable display 120 are the same as the hand-held portable display 30 (FIG. 4) in the first embodiment.

The hand-held portable display 120 therefore attains the same advantages as the hand-held portable display 30 of the first embodiment, and further attains the advantages of the display device 3 in the present embodiment. In particular, because the hand-held portable display 120 has the scattering plate 17 in the display device 3, even when the position of the user's eye 22 changes, light beam from the liquid crystal display 16 can still be properly guided into the user's pupil so that variation in light intensity can be suppressed.

Figure 18:
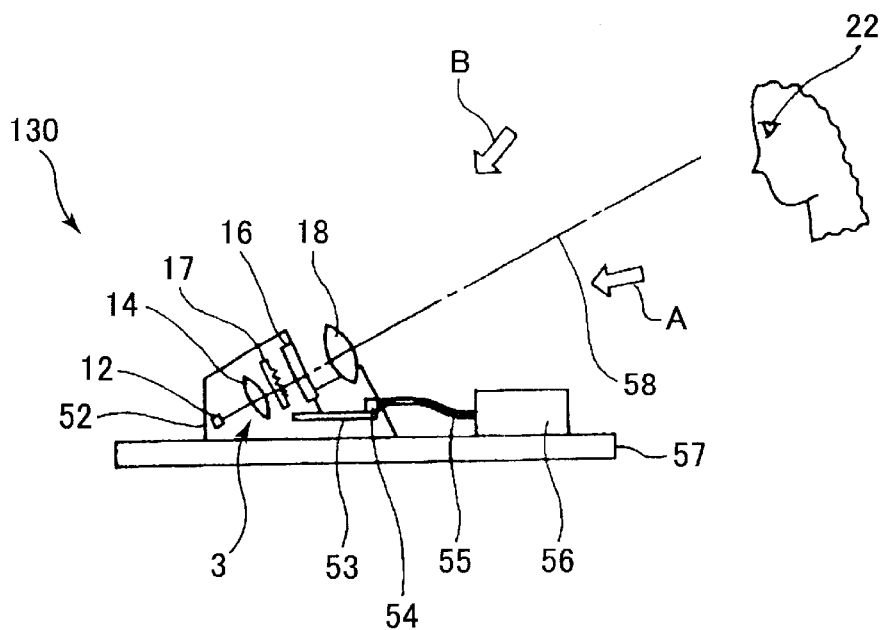
FIG. 18 is a schematic view showing a personal projector that includes the display device of the second embodiment.

FIG. 18 is a schematic view showing a personal projector, in which the display device 3 of the present embodiment is incorporated. Other components of the personal projector 130 are the same as those in the personal projector 50 (FIG. 6) in the first embodiment.

Accordingly, the personal projector 130 attains the same advantages as the personal projector 50 of the first embodiment, and further attains the advantages of the display device 3 of the present embodiment. In particular, because the hand-held portable display 130 has the scattering plate 17 in the display device 3, even when the position of the user's eye 22 changes, light beam from the liquid crystal display 16 can still be properly guided into the user's pupil so that variation in light intensity can be suppressed.

The user will view the image displayed by the personal projector 130 from the same position less frequently in comparison with the situation where the user uses the hand-held portable display or the head mount display. By using the scattering plate 17 in this personal projector 130 to increase the range where variation of intensity does not occur, the user can easily find out for him/herself a position where he/she can view the displayed image without variation in light intensity. Additionally, by changing the value of coefficient n as needed, it is possible to restrict the range, wherein the displayed image can be seen, to increase confidentiality of the displayed image.

Figure 19:
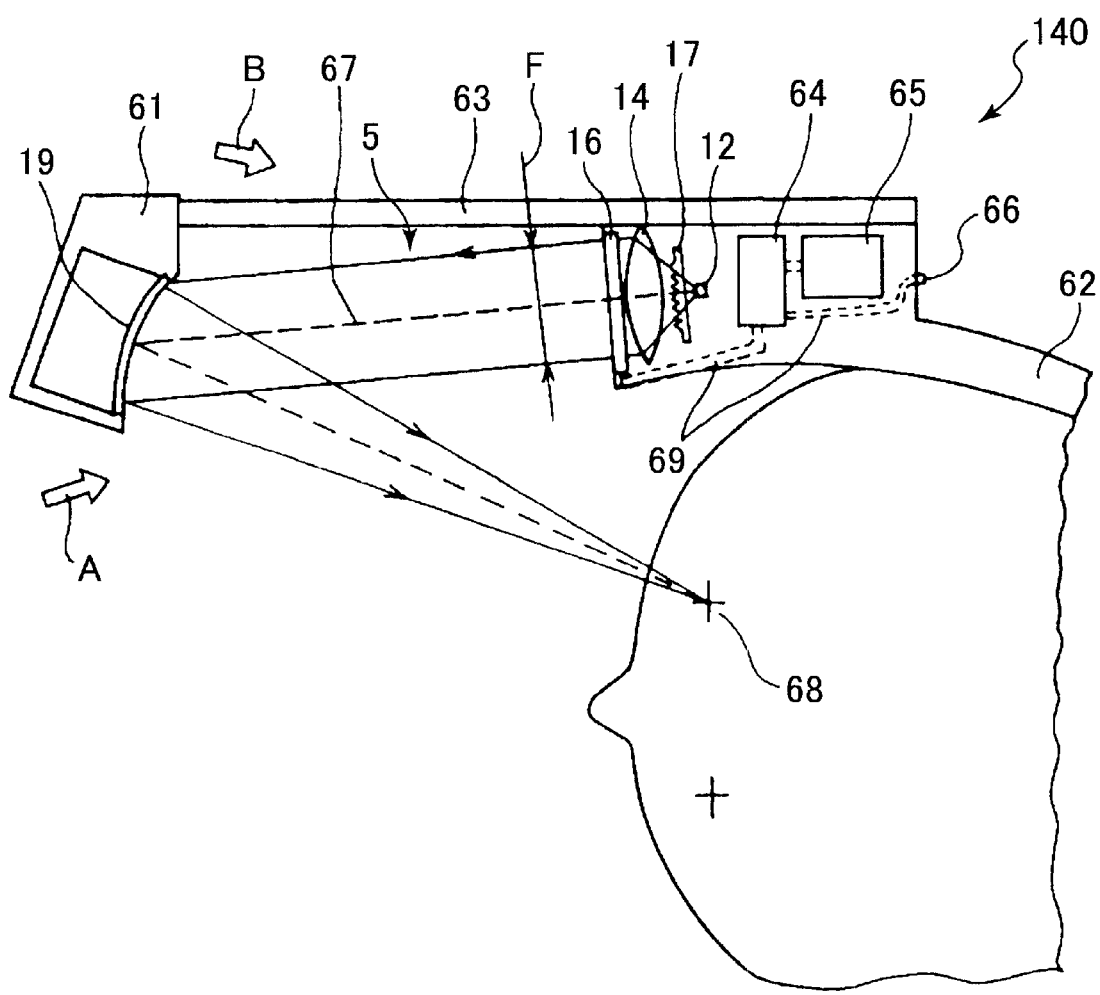
FIG. 19 is a schematic view showing a head mount display that includes a display device of a modification of the second embodiment.

FIG. 19 is an upper schematic view of a head mount display 140 that is incorporated with a display device 5, which is similar to the display device 3 of the present embodiment. The display device 5 is the same as the display device 3 except that the display device 5 has the concave mirror 19 instead of the imaging lens 18. In other words, the display device 5 is the same as the display device 2, which is mounted in the head mount display 60 (Fig. 7A) in the first embodiment, except that the display device 5 is additionally provided with the scattering plate 17. In other words, the display device 5 includes: the white LED 12, the condenser lens 14, the scattering plate 17, the liquid crystal display 16, and the concave mirror 19. It is noted that in the display device 5, the scattering plate 17 is located between the white LED 12 and the condenser lens 14 contrary to the display device 3 where the scattering plate 17 is located between the condenser lens 14 and the liquid crystal display 16.

Similarly to the head mount display 60 of the first embodiment, the concave mirror 19 functions in same manner as the imaging lens 18 of the display device 3, but additionally functions to direct the optical axis 67 from the liquid crystal display 16 in a direction toward the wearer's face. The concave mirror 19 is disposed in a position to provide a substantial conjugate relationship between the white LED 12 and the user's pupil and another substantial conjugate relationship between the liquid crystal display 16 and the user's retina similarly to the concave mirror 19 in FIG. 7B. Thus, the head mount display 140 of the present embodiment has the same configuration as the head mount display 60 of the first embodiment except that the scattering plate 17 is additionally provided.

Accordingly, the head mount display 140 attains the same advantages as the head mount display 60 of the first embodiment, and further attains the advantages of the display device 3 of the present embodiment. In particular, because the head mount display 140 has the scattering plate 17 in the display device 5, even when the position of the user's eye 22 changes, light beam from the liquid crystal display 16 can still be properly guided into the user's pupil so that variation in light intensity can be suppressed.

Figure 20:
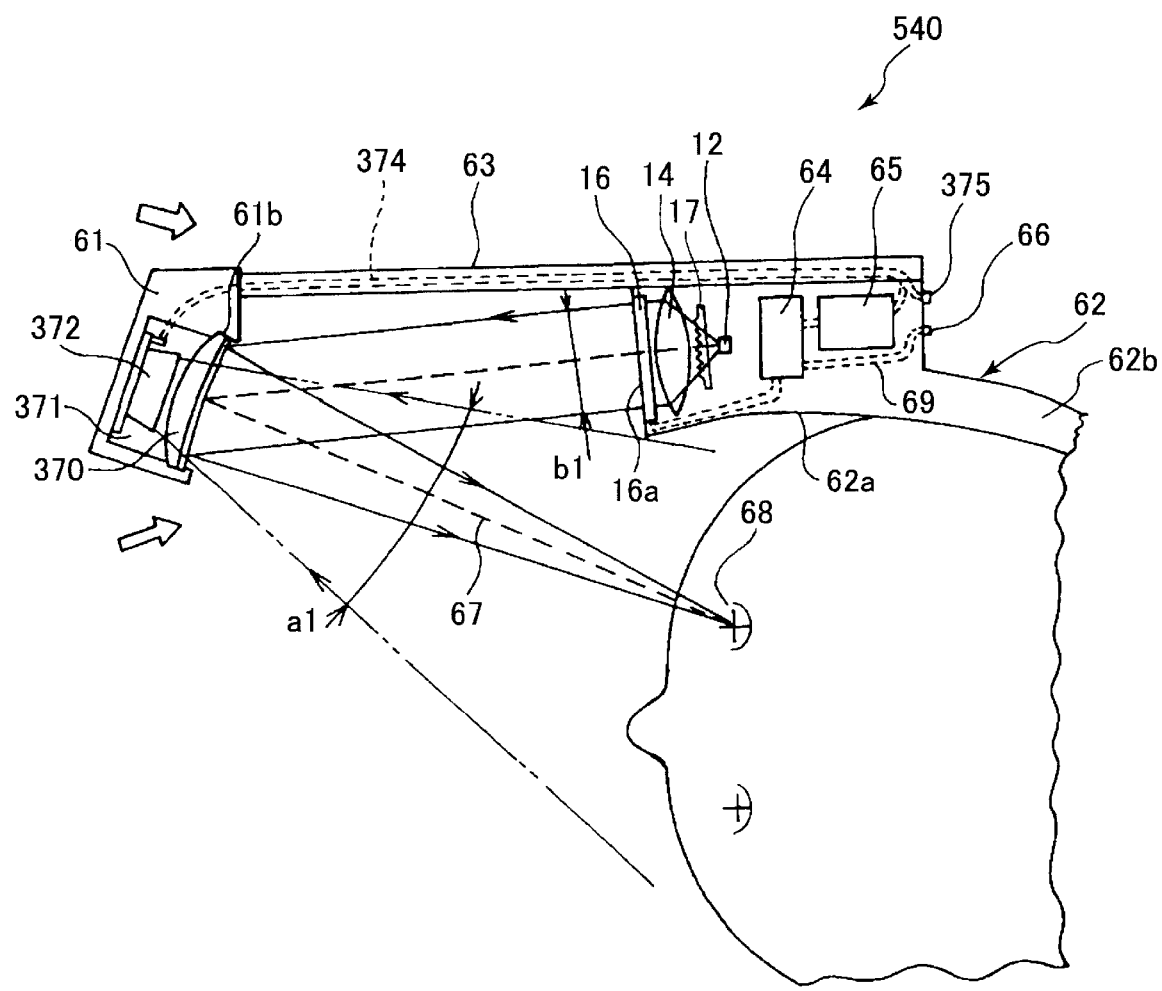
FIG. 20 is a schematic view showing a head mount display camera that includes a display device of another modification of the second embodiment.

The head mount display 140 of FIG. 19 can be modified into a head mount display camera 540 shown in FIG. 20 in the same manner that the head mount display 60 is modified into the head mount display camera 360 (FIG. 8) in the first embodiment. The head mount display camera 510 is the same as the head mount display camera 360 (FIG. 8) except that the scattering plate 17 is additionally provided.

Figure 21:
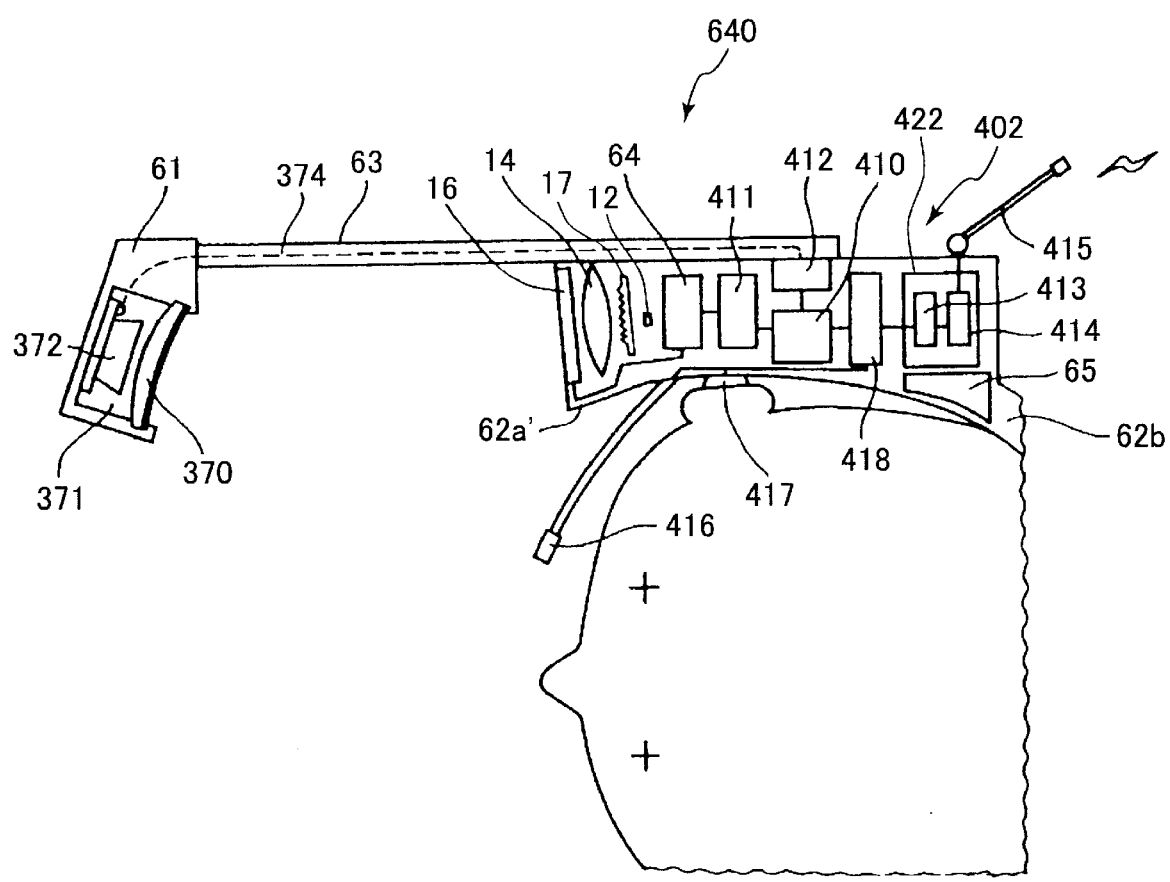
FIG. 21 is a schematic view showing a modification of the head mount display camera of FIG. 20.

The head mount display camera 540 can be further modified into another head mount display camera 640 shown in FIG. 21 in the same manner that the head mount display camera 360 is modified into the head mount display camera 460 (FIG. 11) in the first embodiment. The head mount display camera 640 is the same as the head mount display camera 460 (FIG. 11) except that the scattering plate 17 is additionally provided.

Next will be described a head mount display of another type that is adapted to clipping onto eyeglasses and that includes a display device 6 that is similar to the display device 3 of the present embodiment.

Figure 22A:
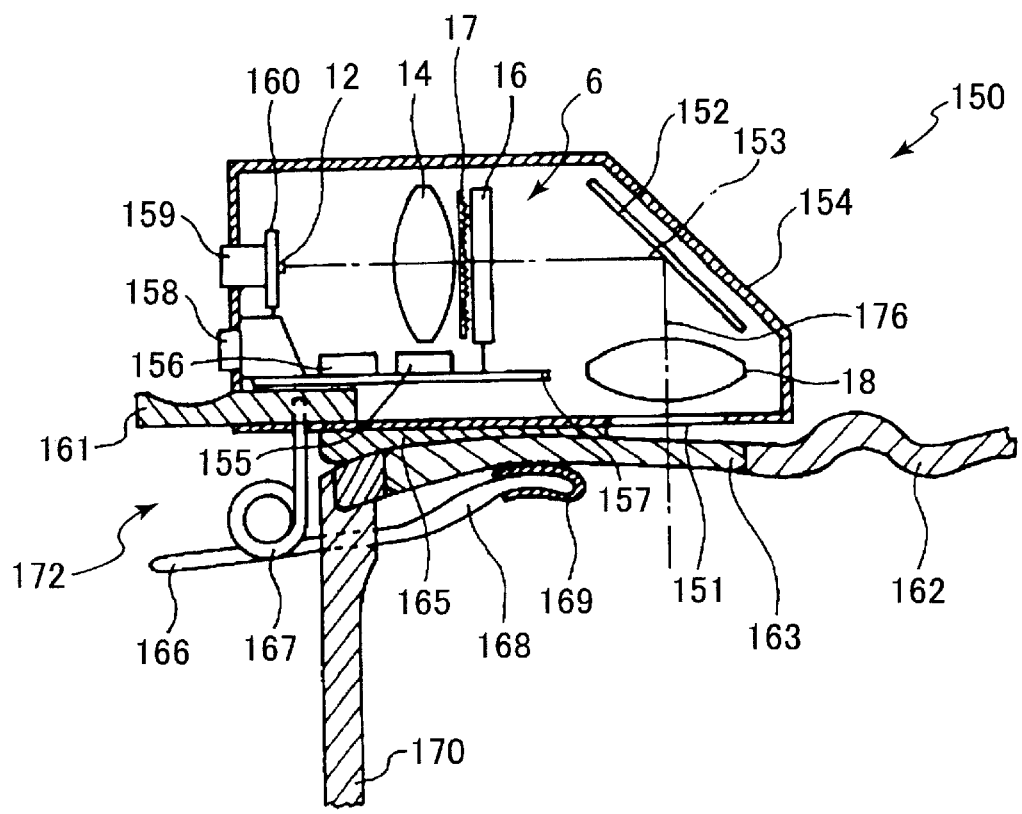
FIG. 22A is a schematic view showing a head mount display of a type that is attached to a pair of glasses and that includes a display device of a further modification of the second embodiment.
Figure 22B:
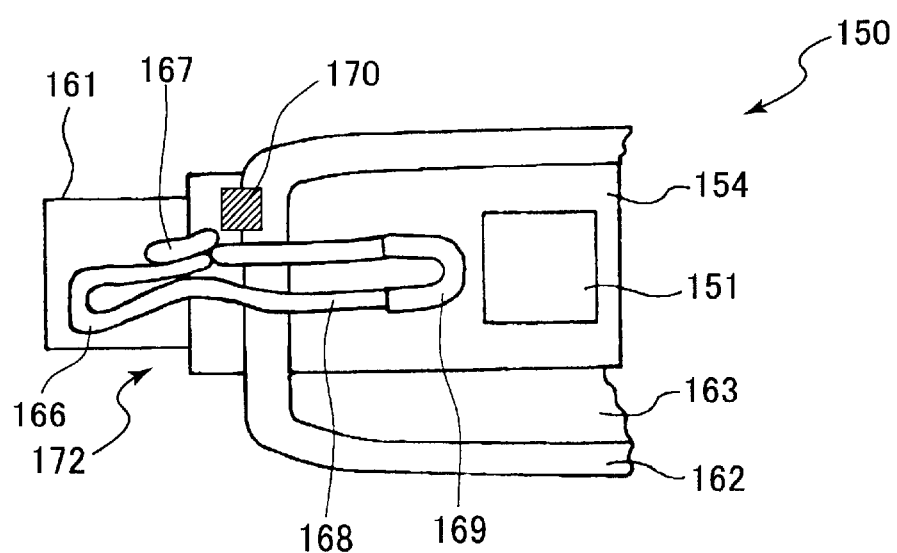
FIG. 22B is a schematic view showing a fixing portion in the head mount display of FIG. 22A.

FIG. 22A is an upper view of a head mount display 150 of the eyeglass clipping type. FIG. 22B is a view of the head mount display 150 shown from the rear side, that is, the user's side, of the pair of glasses.

Figure 23:
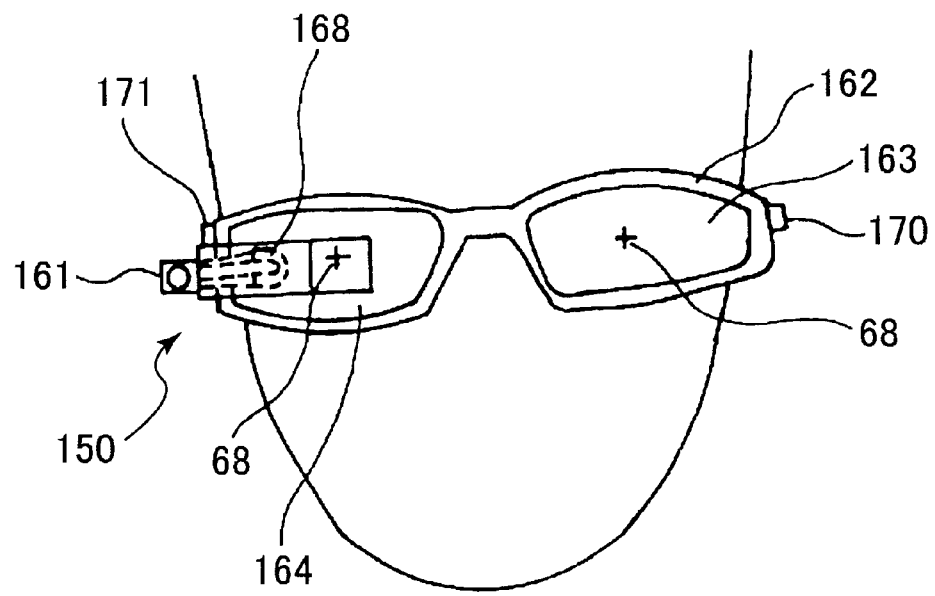
FIG. 23 is a front view showing how the head mount display of FIG. 22A is attached to the right-hand side of his/her eyeglasses.

The head mount display 150 can be used as being clipped onto either side of a pair of glasses. For example, the head mount display 150 can be clipped onto the left eye side of the glasses as shown in FIGS. 22A and 22B. Or, the head mount display can be clipped on the right eye side of the glasses as shown in FIG. 23.

As shown in FIG. 22A, the eyeglass-clipping type head mount display 150 includes a casing 154, in which the display device 6 is incorporated. The casing 154 is formed with an aperture 151 that will confront a lens portion (left lens 163 in FIG. 22A or right lens 164 in FIG. 23) of a pair of glasses when the head mount display 150 is attached to a pair of eyeglasses.

The display device 6 is the same as the display device 3 of the present embodiment except that the imaging lens 18 is located in an orientation that an optical axis (which will be referred to as an "output optical axis" hereinafter) 176 of the imaging lens 18 is perpendicular to an optical axis 153 of the condenser lens 14 and that the display 6 further includes a mirror 152 between the liquid crystal display 16 and the imaging lens 18. That is, the display device 6 includes: the white LED 12, the condenser lens 14, the scattering plate 17, the liquid crystal display 16, the mirror 152, and the imaging lens 18. The mirror 152 serves to bend the optical axis 153 of the condenser lens 14 at right angles to connect the optical axis 153 with the output optical axis 176 of the imaging lens 18. The mirror 152 can therefore guide, to the imaging lens 18, light of the displayed image which has passed through the condenser lens 14, the scattering plate 17, and the liquid crystal display 16. The imaging lens 18 then guides the light of the displayed image toward either left or right eye of the user through the aperture 151. Similarly to the display device 3, the imaging lens 18 is located at a position that the white LED 12 and the user's pupil will be in the substantial conjugate relationship and that the liquid crystal display 16 and the user's retina will also be in the substantial conjugate relationship.

In addition to the display device 6, a circuit board 157 and another circuit board 160 are mounted in the casing 154. An LCD drive circuit 155, an image inverting circuit 156, and a video signal input connector 158 are mounted on the circuit board 167. An inverting switch 159 and the white LED 12 are mounted on the circuit board 160. The inverting switch 159 is electrically connected to the image inverting circuit 156, which is in turn connected to the LCD drive circuit 155.

As shown in FIGS. 22A and 22B, in the eyeglass-clipping type head mount display 150, a fixing portion 172 is provided to the casing 154. The fixing portion 172 is configured from: a protrusion portion 161, an operation portion 166, a clip portion 168, a spring 167, and two rubber members 165 and 169.

The protrusion portion 161 protrudes externally from the inside of the casing 154. The protrusion portion 161 is formed in a shape fitted to the user's finger. When desiring to move the head mount display 150 on the eyeglasses, the user fixes his/her finger on the protrusion portion 161 to facilitate grasping the head mount display 150.

The resilient member 165 such as a rubber member is attached to an outside surface of the casing 154 at its rear side portion that will contact the front surface of each eyeglass lens 163, 164 and an eyeglass frame 162.

The operation portion 166 is connected to the casing 154 via the spring 167 or other resilient member. The user fixes his/her fingers both on the operation portion 166 and the protrusion portion 161 when desiring to move the head mount display 150. The clip portion 168 is integrally formed with the operation portion 166 and the spring 167 so that the clip portion 168 is located at a position opposite to the operation portion 166 with respect to the spring 167. It is noted that the clip portion 168, the operation portion 166, and the spring portion 167 are formed from a single steel spring wire as shown in FIG. 22B. The rubber member 169 or other resilient member is provided covering the vicinity around the tip end of the clip portion 168. The spring 167 serves to constantly urge the clip portion 168 in a direction toward the rubber member 165 on the casing 154.

As shown in FIGS. 22A through 23, in order to attach the head mount display 150 to the pair of glasses, the clip portion 168 is clipped onto the pair of glasses at a position below one ear piece portion (170 or 171) of the pair of glasses. In this condition, the clip portion 168 confronts the casing 154 through the corresponding eyeglass lens (163 or 164). In the example of FIG. 22B, the clip portion 168 is clipped onto the left-side glass 163 at a position below the left ear piece portion 170 of the pair of glasses. In this condition, the clip portion 168 confronts the casing 154 through the left eyeglass lens 163. Similarly, the clip portion 168 can be clipped onto the right-side glass 164 at a position below the right ear piece portion 171 as shown in FIG. 23. In this condition, the clip portion 168 confronts the casing 154 through the right eyeglass lens 164. When the head mount display 150 is thus attached to the eyeglasses, the two rubber members 165 and 169 sandwich the corresponding lens 163 or 164 by the resilient force of the spring 167 so that the head mount display 150 is fixed onto the pair of glasses.

Figure 24:
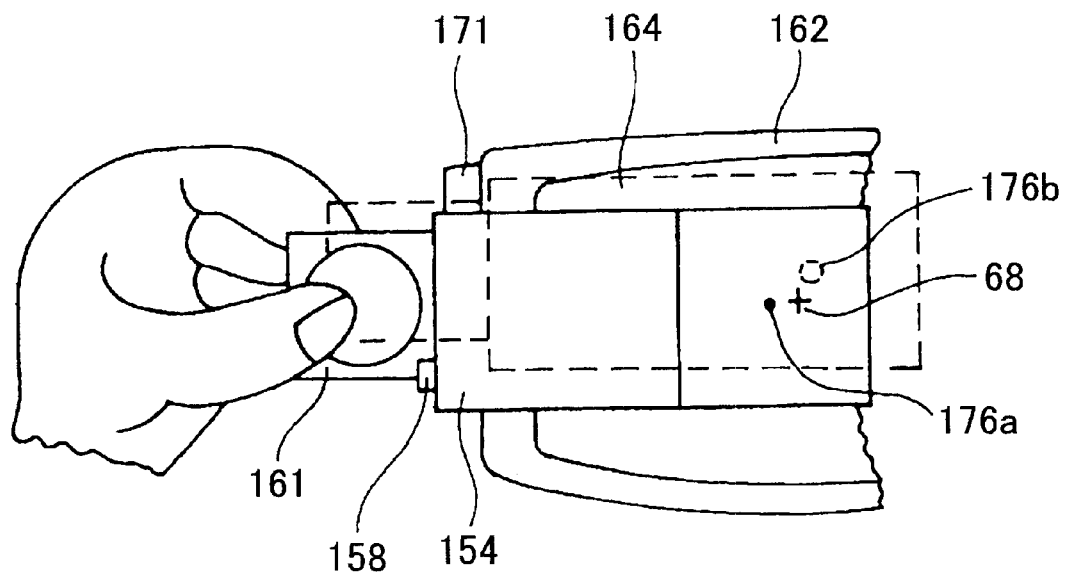
FIG. 24 illustrates how an output optical axis of the head mount display moves according to the movement of a casing of the head mount display is switched between attachment to the right-hand side and attachment to the left-hand side.

With the fixing portion 172 of the above-described structure, it is easy to align the output optical axis 176 of the head mount display 150 with the user's pupil. That is, the user can perform his/her eye point alignment by simply using his/her fingers to squeeze the protrusion portion 161 and the operation portion 166 together against the resilient force of the spring 167. Then, the user moves the casing 154 following the front surface of the eyeglass lens 163 or 164, while separating the rubber member 169 from the lens. With this simple operation, as shown in FIG. 24, the user can smoothly move the casing 154 from the position indicated by a solid line to a position indicated by a broken line. As a result of this movement, the output optical axis 176 will move from the position 176a, indicated by a black dot in the figure, to another position 176b indicated by a white circle in the figure. When the user confirms that the output optical axis 176 is in alignment with the eye point 68, he/she releases his/her fingers from the protrusion portion 161 and the operation portion 166 so that the rubber members 165 and 169 sandwich the corresponding lens 163 or 164. As a result, the output optical axis 176 will be fixed in alignment with the eye point 68. Thus, the fixing portion 172 having the simple configuration enables the user to easily perform two dimensional eye point adjustment by performing the above-described simple operation. Eye point adjustment can be performed with great freedom. Alignment of the eye point 68 and the output optical axis 176 is possible within a broad range.

Because the head mount display 150 is of a single eye observation type that is configured so as to be capable of guiding an image light toward either left or right eye of the user, the casing 154 is formed with relatively small weight configuration.

Because the fixing mechanism 172 is configured to sandwich a desired glass lens 163 or 164 from both sides, the head mount display 150 can be fixed to even glasses of a type that is provided with no frames. It is noted that there are a great variety of eyeglasses with different shaped frames 162 and with different shaped ear pieces 170, 171. In order to allow the user to attach the head mount display 150 to each of these variety of eyeglasses, there is a potential problem that it would be necessary to change the shape or configuration of the fixing mechanism 172 for each type of glasses. According to the present embodiment, however, this type of potential problem is solved by employing the above-described configuration for the fixing mechanism 172, wherein the head mount display 150 is fixed in place by sandwiching either lens 163 or 164 from both surfaces. Because the fixing portion 172 contacts the lens via the rubber members 165 and 169, the lenses 163, 164 will not be damaged when the head mount display 150 is attached in place by sandwiching operation.

As described above, the head mount display 150 can be attached to either right or left lens in the pair of glasses. It is noted, however, that the head mount display 150 has to be turned upside down when switching the attachment position of the head mount display 150 from the left (or right) lens to the right (or left) lens. The image inversion circuit 156 and the inversion switch 159 serve to compensate for the turning of the head mount display 150 upside down. By the function of these two components 156 and 159, the user can view a normal image even when the attachment position is changed from right lens to left lens or from left lens to right lens.

Figure 25:
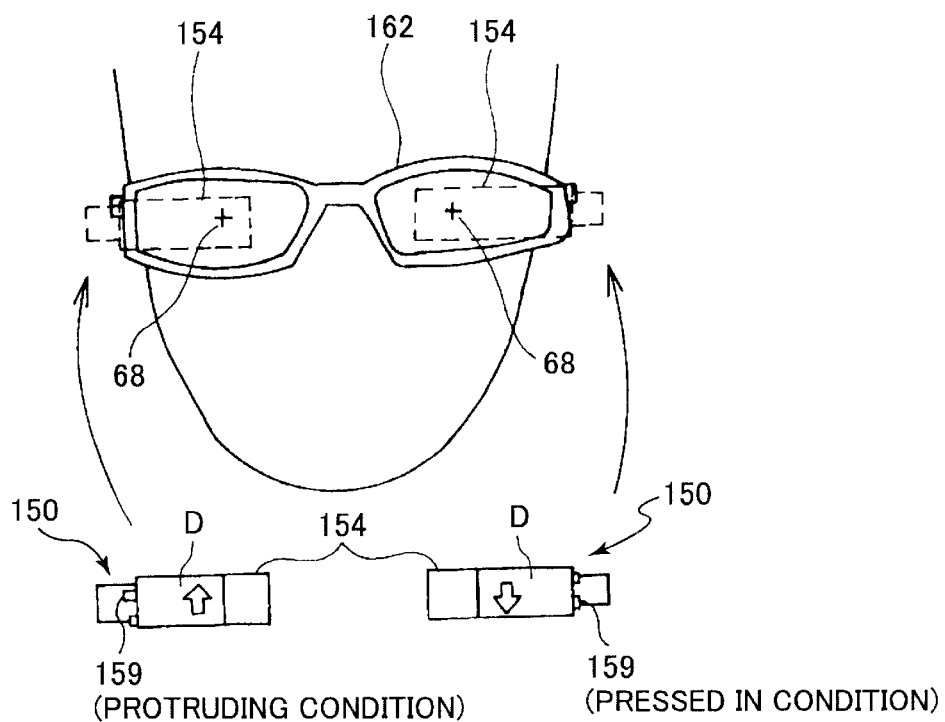

More specifically, as viewed in FIG. 25, the orientation of the casing 154 is switched upside down when the casing 154 is attached to the left lens in comparison with the situation when the casing 154 is attached to the right lens. In this figure, the normal upward direction for the casing 154 is indicated by an arrow D. When the head mount display 150 is mounted on the right hand lens, the normal upward direction of the casing 154 directs upwardly. In this situation, the inversion switch 159 is manually set by the user to protrude outward. On the other hand, when the head mount display 150 is mounted on the left hand lens, the normal upward direction of the casing 154 directs downwardly. In this situation, the inversion switch 159 is manually pressed in by the user.

Figure 26:
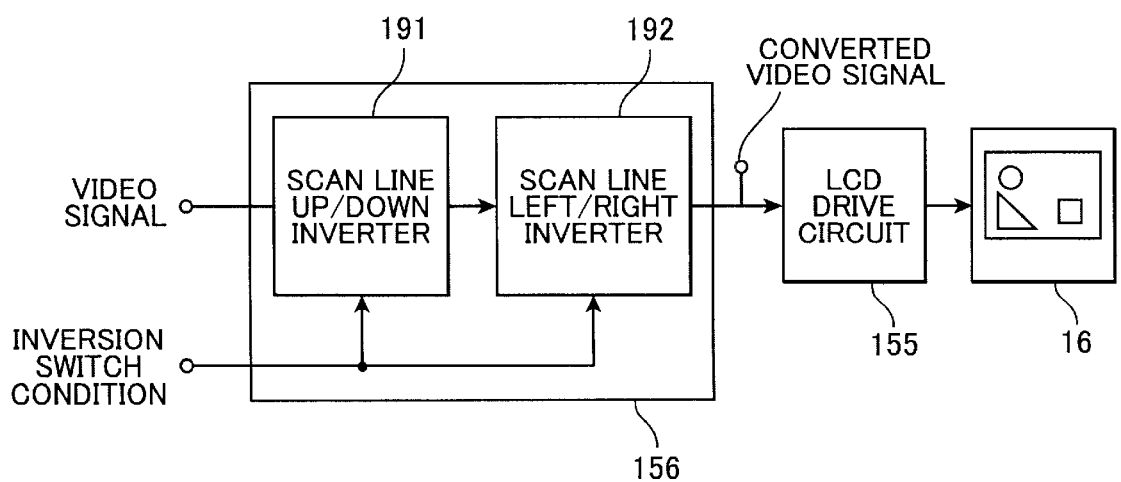
FIG. 26 is a block diagram showing an image inverting mechanism employed in the head mount display of FIG. 15A.

The protruding or pressed-in condition of the inversion switch 159 is supplied to the image inversion circuit 156 as shown in FIG. 26. The image inversion circuit 156 includes a scan line up/down inversion unit 191 and a scan line left/right inversion unit 192. The condition of the inversion switch 159 is supplied both to the units 191 and 192. The scan line up/down inversion unit 191 is designed further to receive a video signal which is supplied via the video signal input connector 158 from outside. When the units 191 and 192 receive the signal indicating that the inversion switch 159 protrudes outward, the circuit 191 supplies the externally-supplied video signal as is to the scan line left/right inversion unit 192, and the scan line left/right inversion unit 192 also supplies the received video signal as is to the LCD drive circuit 155. Thus, the units 191 and 192 cooperate to supply the externally-supplied video signal as is to the LCD drive circuit 155.

On the other hand, when the circuits 191 and 192 receive the signal indicating that the inversion switch 159 has been pressed in, then the scan line up/down inversion circuit 191 inverts the externally-supplied video signal upside down, and further the scan line left/right inversion circuit 192 switches left and right of the video signal, and then supplies the thus modified video signal to the LCD drive circuit 155.

In this way, regardless of whether the casing 154 of the head mount display 150 is fixed to either the right or left lens of the pair of glasses, operation of the inversion circuits 191 and 192 ensures that the user can always view the normal image that is not upside down. Accordingly, the head mount display 150 can be used for attachment to either left-hand or right-hand lens. There is no need to provide two separate types of display devices, one for the left-hand lens and one for the right-hand lens.

The display device 6 employed in the head mount display 150 has the same configuration as the display device 3 of the present embodiment with exception of the mirror 152 used for bending the optical axis. Therefore, the head mount display 150 derives the same advantages as the display device 3. That is, the displayed image will normally be almost always focused onto the retina of the user's eye due to the long focal depth. Because the white LED 12 and the condenser lens 14 are used and also because the white LED 12 has substantially conjugate relationship with the pupil of the user, power consumed by the white LED 12 can be reduced. Also, because the white LED 12 is used, the image can be full color.

Because the scattering plate 17 is used, variation in the intensity of the displayed image can be prevented even when the head mount display 150 moves slightly out of line with the user's eye. As described already, because the scattering plate 17 has the luminous intensity distribution of $I(\theta) = \cos^n \theta$, it is desirable that the coefficient n be greater than or equal to 3 and less than or equal to 100 ($3 \leq n \leq 100$).

Next will be described a modification of the eyeglass-clipping type head mount display.

Figure 27A:
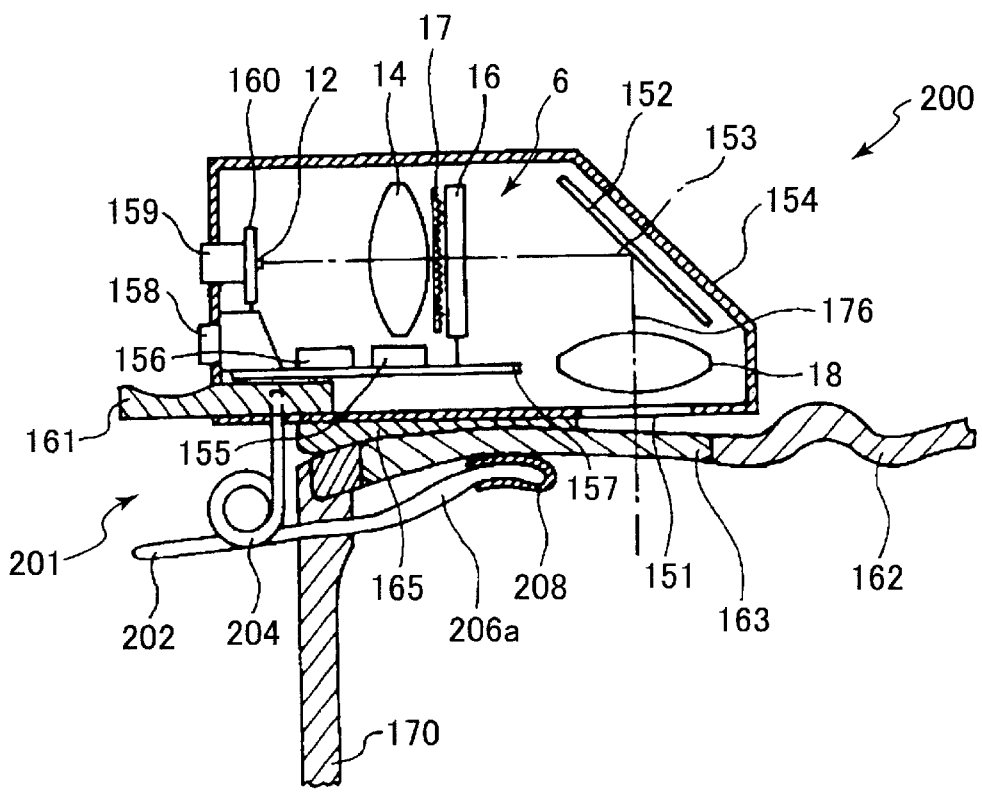
FIG. 27A is a schematic view showing another eyeglass-clipping type head mount display provided with a modified fixing portion.
Figure 27B:
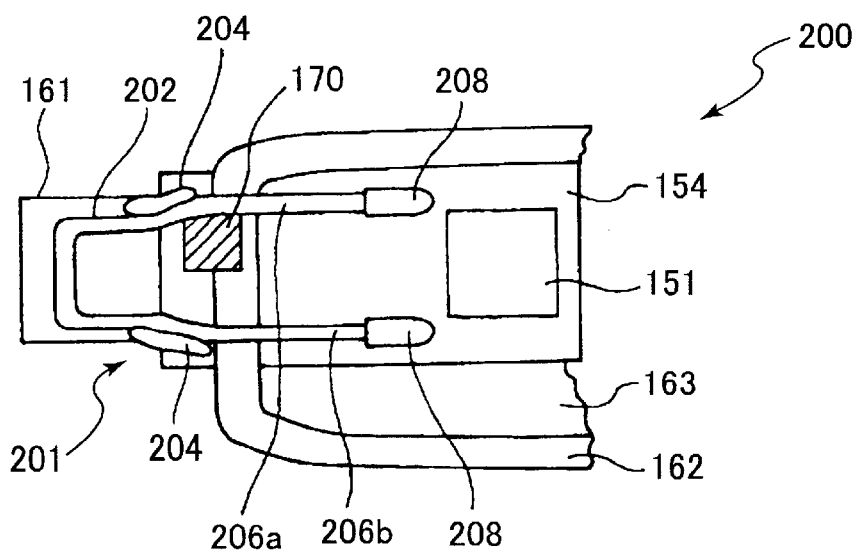
FIG. 27B is a schematic view showing the modified fixing portion of the head mount display of FIG. 27A.
Figure 28:
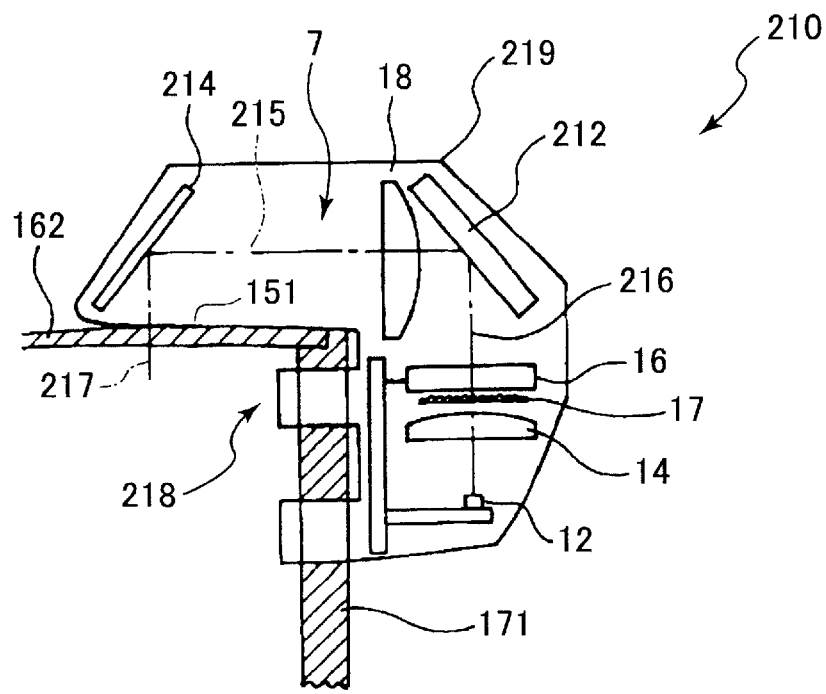
FIG. 28 is another eyeglass-clipping type head mount display that includes a display device of still another modification of the second embodiment where two mirrors are provided.

FIG. 27A is an upper view of the head mount display 200 of this modification. FIG. 27B is a view of the head mount display 200 shown from the rear side, that is, the user's side, of the pair of glasses.

As shown in FIGS. 27A and 27B, the head mount display 200 according to the present modification is the same as the head mount display 150 except for a fixing portion 201. The fixing portion 201 is the same as the fixing portion 172 of FIGS. 22A and 22B only in that the rubber member 165 is mounted on the casing 154. In the fixing portion 172 of FIGS. 22A and 22B, the single clipping portion 168 is integrally provided to the operation portion 166. Contrarily, according to the present modification, two clipping portions 206a and 206b are integrally provided to a single operation portion 202. The operation portion 202 and the clipping portions 206a and 206b are formed by bending a single long-shaped rod member into a substantially U shape. A rubber member 208 is provided covering the tip end of each clipping portion 206a or 206b. Two springs 204 are provided at respective positions where the clipping portions 206a and 206b are connected to the operation portion 202. Each spring 204 is for urging the corresponding clipping portion 206a or 206b in a direction toward the casing 154.

With the fixing portion 201 having the above-described structure, the head mount display 200 is attached to the pair of glasses at a position that the ear piece 170 or 171 of the eyeglasses will be sandwiched between the two clipping portions 206a and 206b. In this way, the casing 154 can be fixed to the glasses with the fixing portion 201 sandwiching the ear piece 170 or 171 between the clipping portions 206a and 206b. Because the fixing portion 201 is thus supported by the ear piece 170 or 171, the casing 154 is fixed more stable. Problems such as the casing 154 shifting out of a desired position or falling off the eyeglasses can be prevented more reliably.

Although two clipping portions 206a and 206b are provided in this example, three or more clipping portions could be provided as long as two of the clipping portions sandwich the ear piece therebetween.

It is noted that the display device 6 that is incorporated into each of the above-described head mount displays 150 and 200 includes only a single mirror 152. However, two mirrors could be provided instead. This situation will be described below while referring to FIG. 28.

An eyeglass-clipping type head mount display 210 of this modification includes a casing 219 and a display device 7 mounted in the casing 219. The casing 219 is formed with an aperture 151 at a position that confronts a lens of the eyeglasses. In the display device 6 of FIG. 22A, the white LED 12, the condenser lens 14, the scattering plate 17, and the liquid crystal display 16 are located so that the optical axis 153 of the condenser lens 14 is directed almost parallel to the surface of the glass lens 163 or 164. Contrarily, in the display device 7 of this modification, the white LED 12, the condenser lens 14, the scattering plate 17, and the liquid crystal display 16 are located so that the optical axis 216 of the condenser lens 14 is directed almost parallel to the ear piece portion 170 or 171. Additionally, in the display device 7, two mirrors 212 and 214 are provided instead of the single mirror 152 in the display device 6. In other words, the display device 7 includes: the white LED 12, the condenser lens 14, the scattering plate 17, the liquid crystal display 16, the mirror 212, the imaging lens 18, and the other mirror 214. Similarly to the display device 3 of FIG. 12, the substantial conjugate relationship is established both between the white LED 12 and the user's pupil and between the liquid crystal display 16 and the user's retina.

The mirror 212 is disposed at a position for bending the optical axis 216 of the condenser lens 14 at right angles to connect the optical axis 216 to the optical axis 215 of the imaging lens 18. The mirror 214 is disposed at a position for bending the optical axis 215 of the imaging lens 18 at right angles to connect the optical axis 215 to an output optical axis 217 that proceeds through the aperture 151. The mirrors 212 and 214 cooperate to reflect light of a displayed image substantially by 180 degrees in total to guide the light to either left or right eye of the user.

In this modification, a fixing portion 218 is provided to attach the head mount display 210 to the eyeglasses. The fixing portion 218 is not of the lens-sandwiching type that is employed in each of the fixing portion 172 (FIG. 22A) or the fixing portion 201 (FIG. 27A). Instead, some mechanism, such as a screw mechanism, is provided for attaching the casing 219 to either the left ear piece 170 or the right ear piece 171, allowing the user to move the casing 219 to adjust eye point alignment. It is noted that details of the components in the head mount display 210, other than the display device 7, are not shown in FIG. 28 for the purposes of clarity.

Next will be described still another modification of the eyeglass-clipping type head mount display.

Figure 29:
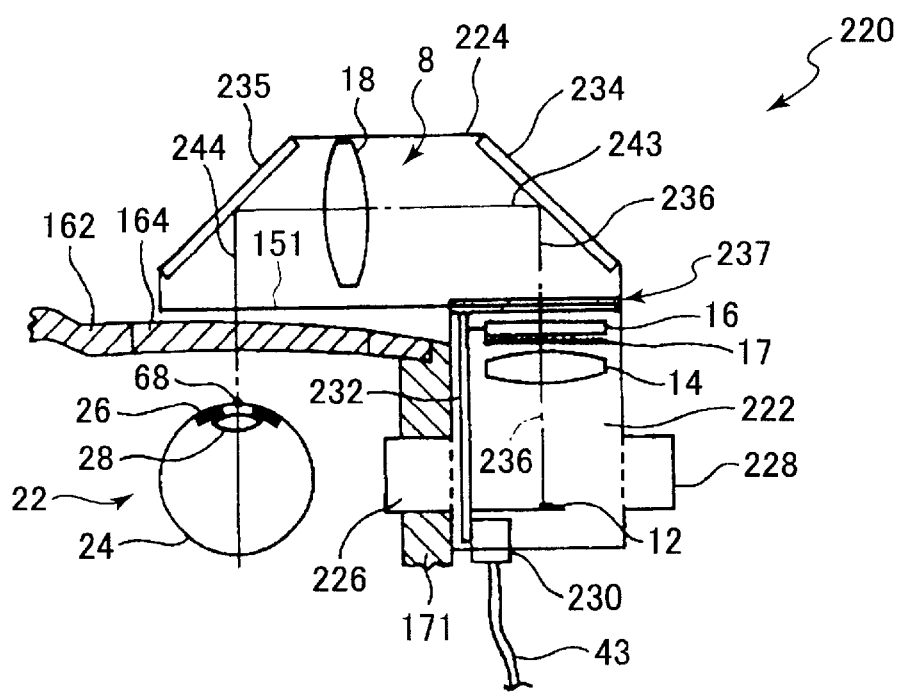
FIG. 29 is a top view showing still another eyeglass-clipping type head mount display that includes a display device of another modification of the second embodiment, and showing how the head mount display is attached to the right side of the user's glasses.
Figure 33:
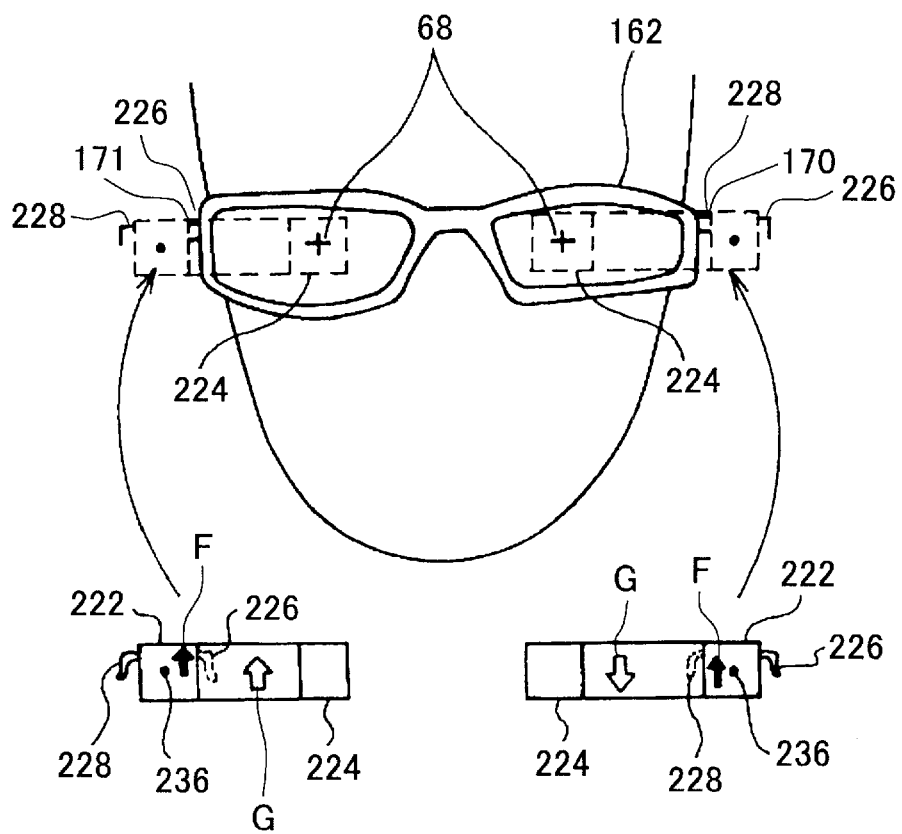
FIG. 33 illustrates how the fixing casing is not turned upside down, but only the rotatable casing is turned upside down when the head mount display is switched between attachment to the right lens and attachment to the left lens.

FIG. 29 is an upper schematic view showing configuration of the head mount display 220 according to the present modification. The head mount display 220 can be attached to either the right-hand or left-hand lens in a pair of glasses similarly to the above-described head mount displays 150, 200, and 210. For example, the head mount display 220 can be attached to the right-hand lens of the user's glasses as shown in FIG. 29. The head mount display 220 can be attached to the left lens of the user's glasses as shown in FIG. 33.

Figure 30:
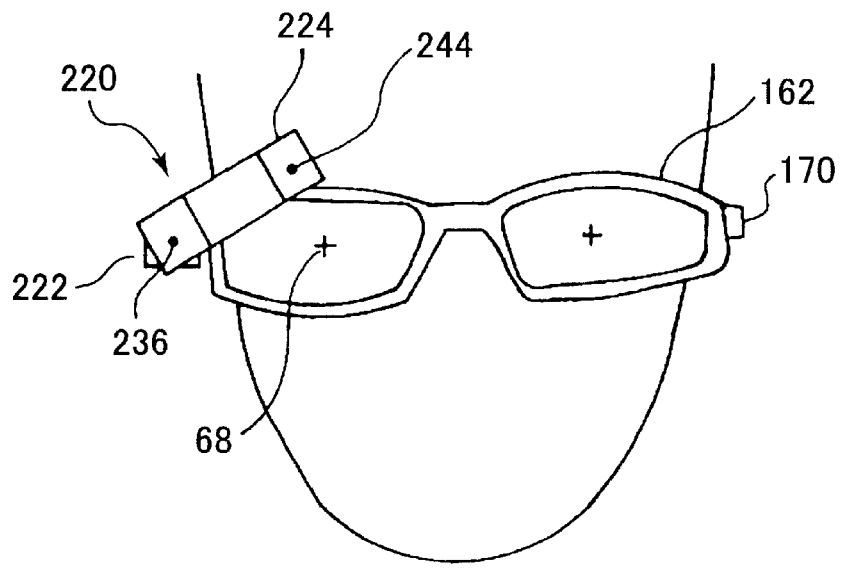
FIG. 30 is a front view showing how the head mount display of FIG. 29 is attached to the right side of the user's glasses.
Figure 32:
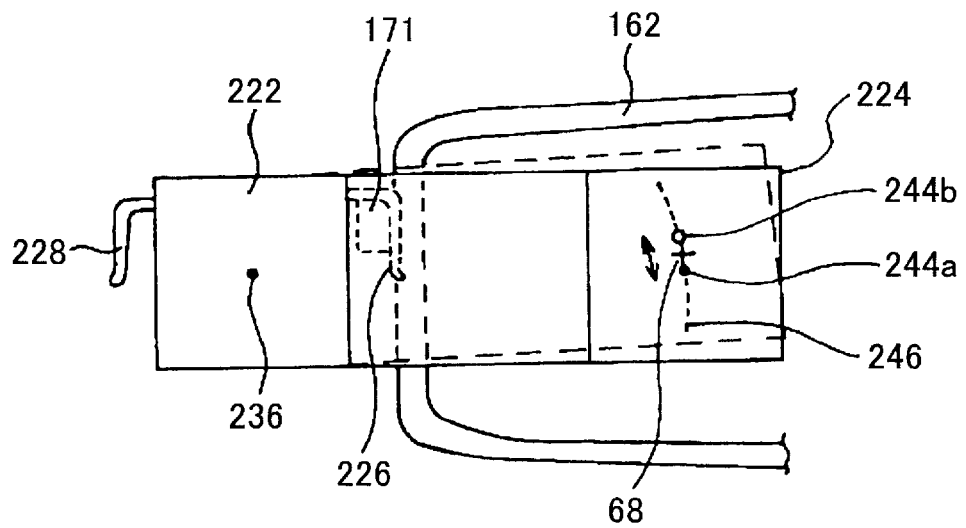
FIG. 32 illustrates how the fixing portion is fixed to the eyeglasses using a fixing clip and how an output optical axis moves according to the movement of the rotatable casing.

As shown in FIG. 29, the head mount display 220 includes two casings: a fixing casing 222 and a rotatable casing 224. As shown in FIGS. 29 and 32, a pair of fixing clips 226 and 228 are provided to an outer surface of the fixing casing 222 at its left and right sides. As shown in FIG. 33, the fixing casing 222 is fixed to the left ear piece 170 using the right-side fixing clip 228, while the fixing casing 222 is fixed to the right ear piece 171 using the left-side fixing clip 226. The rotatable casing 224 is attached rotatably to the fixing casing 222 as shown in FIG. 30.

More specifically, as shown in FIG. 32, the fixing clips 226 and 228 have the same configuration with each other. Each fixing clip 226, 228 is formed from a flexible material and shaped substantially into an L shape as viewed in FIG. 32. The free tip of each fixing clip 226 and 228 is formed with a slightly outwardly protruding curve. With this configuration, by sandwiching the right ear piece 171 between the left-hand fixing clip 226 and the fixing casing 222, the fixing casing 222 can be fixed to the right side of the pair of glasses. Similarly, by sandwiching the left ear piece portion 170 between the right-side fixing clip 228 and the fixing casing 222, the fixing casing 222 can be fixed to the left side of the pair of glasses. Because each fixing clip 226 and 228 is formed from a flexible material, it can be clipped stably on a variety of different-width ear pieces 171 and 170. Using the fixing clips 226 and 228, the head mount display 220 can be easily clipped onto even eyeglasses of a type that are not specifically adapted for being attached with the head mount display 220.

As shown in FIG. 29, the head mount display 220 includes a display device 8 that is the same as the display device 3 of the present embodiment except that two mirrors 234 and 235 are provided. That is, the display device 8 includes: the white LED 12, the condenser lens 14, the scattering plate 17, the liquid crystal display 16, the mirror 234, the imaging lens 18, and the mirror 235. The components of the display device 8 are located at positions to establish the substantial conjugate relationship between the white LED 12 and the pupil of the user's eye and between the liquid crystal display 16 and the retina of the user's eye similarly to the display device 3.

The fixing casing 222 houses therein: the white LED 12, the condenser lens 14, the scattering plate 17, and the liquid crystal display 16 in the display device 8. Similarly to the head mount display 210 in FIG. 28, the white LED 12, the condenser lens 14, the scattering plate 17, and the liquid crystal display 16 are located so that the optical axis 236 of the condenser lens 14 is directed almost parallel to the ear piece 171 or 171. The fixing casing 222 further houses a circuit board 232 therein. A control circuit (not shown) controlling the white LED 12 and the liquid crystal display 16 is mounted on the circuit board 232. A video signal input connector 230 is also mounted on the circuit board 232. The video signal input connector 230 is connected to the control circuit (not shown) on the circuit board 232, and protrudes outside from the fixing casing 222. The video signal input connector 230 is connected to an external image player (not shown) via a video cable 43.

The rotatable casing 224 houses therein the mirrors 234 and 235 and the imaging lens 18. The mirror 234 is for bending the optical axis 236 of the condenser lens 14 by right angles to connect the optical axis 236 to the optical axis 243 of the imaging lens 18. The mirror 235 is for bending the optical axis 243 of the imaging lens 18 by right angles to connect the optical axis 243 to an output optical axis 244 that emits outside of the casing 224 through an opening 151 which is formed to the casing 224. Thus, the mirrors 234 and 235 cooperate to reflect light that has emitted from the white LED 12 and that has passed through the condenser lens 14, the scattering plate 17, and the liquid crystal display 16 toward either the user's left or right eye 22 via the opening 151. In the example of FIG. 29, the light is guided to the user's right eye. The imaging lens 18 forms, on the retina of the user's eye, an image from the light modulated by the liquid crystal display 16.

Figure 31:
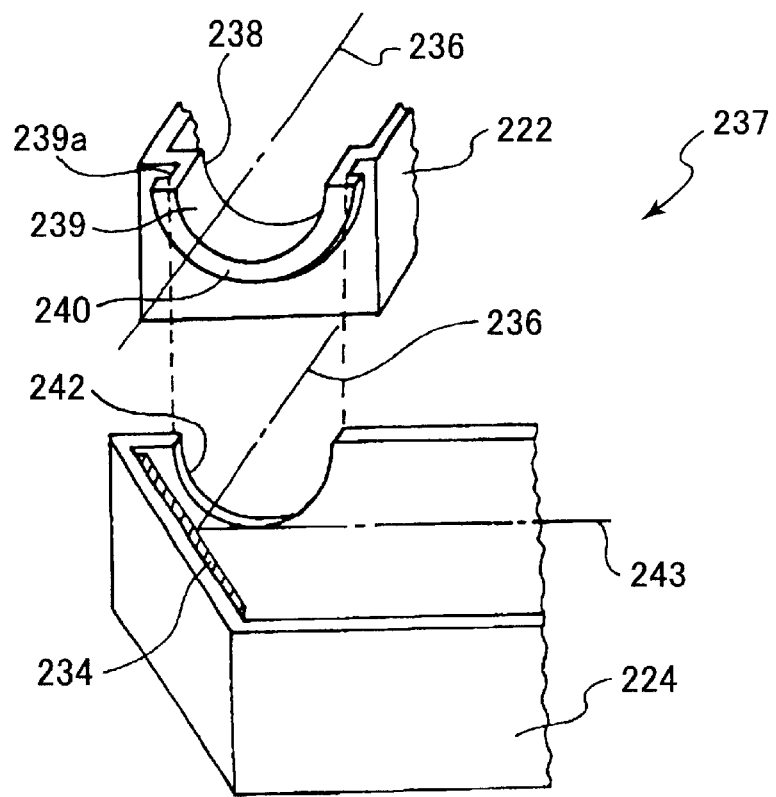
FIG. 31 is a enlarged exploded view of essential parts of a rotatable casing and a fixing casing at a connection portion in the head mount display of FIG. 29.

The rotatable casing 224 is rotatably connected to the fixing portion 222 via a connection portion 237. As shown in FIG. 31, a circular opening 238, centered on the optical axis 236 of the condenser lens 14, is formed in one end portion of the fixing casing 222. A protrusion portion 239 protrudes from the fixing casing 222 following the direction of the optical axis 236 and surrounds the opening 238. A flange 240 is provided at a free tip end of the protrusion portion 239. The flange 240 defines a groove 239a at an outer periphery of the protrusion portion 239.

The rotatable casing 224 is provided with a circular opening 242 whose inner peripheral diameter corresponds to the outer peripheral diameter of the protrusion portion 239 at the groove 239a. By engaging the groove 239a of the protruding portion 239 in the circular opening 242, the rotatable casing 224 is rotatably supported to the fixing casing 222. The rotatable casing 224 can be rotated by 360 degrees around the optical axis 236. Friction between the groove 239a and the circular opening 242 can stop the rotatable casing 224 at any desired position as shown in FIG. 30. Accordingly, the head mount display 220 enables easy alignment between the eye point 68 and the output optical axis 244 using the above-described simple configuration of the connection portion 237 and easy operation of rotating the rotatable casing 224 around the optical axis 236.

As shown in FIG. 32, when desiring to align the output optical axis 244 with the user's pupil, i.e., the user's eye point 68, the user holds the rotatable casing 224 with his/her fingers, and rotates the rotatable casing 224. With this simple operation, the rotatable casing 224 can be smoothly moved from the position indicated by a solid line in the figure to the position indicated by a broken line in the figure. In association with this movement, the output optical axis 244 is moved from the position indicated by a black dot 244a following the path 246 indicated by another broken line in the figure to the position 244b indicated by a which circle in that figure. Accordingly, after performing adjustment to correct for differences in the eye points between individuals, the user stops rotating the rotatable casing 224 at a position where the user can confirm that the output optical axis 224 is in alignment with the eye point 68. Thus, the output optical axis 224 can be fixed in alignment with the eye point 68.

By using the fixing clips 226 and 228, the fixing casing 222 can be fixed to either the left ear piece portion 170 or right ear piece portion 171 without the fixing casing 222 having been turned upside down. More specifically, as shown in FIG. 33, it is sufficient to simply invert the orientation of the rotatable casing 224 in order to switch between attachment for the left eye and for the right eye. There is no need to switch the orientation of the fixing casing 222 as indicated by an arrow F in the figure, as opposed to the orientation of the rotatable casing 224 as indicated by another arrow G. More specifically, when the head mount display 220 is attached to the right side of the eyeglasses, the normal upward direction G of the rotatable casing 224 directs upwardly, and the normal upward direction F of the fixing casing 222 also directs upwardly. When the head mount display 220 is attached to the left side of the eyeglasses, the normal upward direction G of the rotatable casing 224 directs downwardly, but the normal upward direction F of the fixing casing 222 still directs upwardly. Accordingly, there is no need to provide the head mount display 220 with the special mechanism, such as the inverting mechanism employed in the head mount display 150 of FIG. 22A, for inverting the displayed image. The head mount display 220 can therefore be used for either left or right lens viewing with the simple configuration so there is no need to provide two separate head mount displays, one for the left eye and one for the right eye.

In the head mount display 220, the mirrors 234 and 235, which cooperate to reflect light modulated by the liquid crystal display 16 by 180 degrees in total to guide the light toward either the left or right eye of the user, are disposed in the rotatable casing 224. For this reason, the fixing casing 222 can be fixedly disposed on the side of the user's eyeglasses. The fixing casing 222 will not interfere with the user's vision. The entire head mount display 220 is not made bulky.

The rotatable casing 224 is used for viewing images only with a single eye, and the rotatable casing 224 does not include the white LED 12, the condenser lens 14, the scattering plate 17, or the liquid crystal display 16. The rotatable casing 224 therefore has a relatively small shape and light weight. The small and light rotatable casing 224 is rotatably attached to the fixing casing 222. Accordingly, when the user would not like to view the displayed image or when the user has to see his/her surroundings for urgent situation, the user can easily and immediately retract the rotatable casing 224 out of his field vision as shown in FIG. 30 by applying only a slight force to the rotatable casing 224.

In the above-described example, the imaging lens 18 is disposed in the rotatable casing 224. However, the imaging lens 18 could be disposed in the fixing casing 222 instead.

The imaging lens 18 and the mirror 234 are disposed so as to connect the optical axis 243 of the imaging lens 18 with the optical axis 236 of the condenser lens 14. For this reason, even when the rotatable casing 224 is rotated to adjust eye point alignment, the optical axes of the imaging lens 18 and of the condenser lens 14 will always remain in alignment so that the imaging performance remains good.

The display device 8 employed in the head mount display 220 has the same configuration as the display device 3 of the present embodiment with exception of the mirrors 234 and 235 used for bending the optical axis. Therefore, the head mount display 220 derives the same advantages as the display device 3. That is, the displayed image will normally be almost always focused onto the retina of the user's eye due to the long focal depth. Because the white LED 12 and the condenser lens 14 are used and also because the white LED 12 has substantially conjugate relationship with the pupil of the user, power consumed by the white LED 12 can be reduced. Also, because the white LED 12 is used, the image can be full color.

Because the scattering plate 17 is used, variation in the intensity of the displayed image can be prevented even when the head mount display 220 moves slightly out of line with the user's eye. As described already, because the scattering plate 17 has the luminous intensity distribution of $I(\theta) = \cos^n\theta$, it is desirable that the coefficient n be greater than or equal to 3 and less than or equal to 100 ($3 \leq n \leq 100$).

Figure 34A:
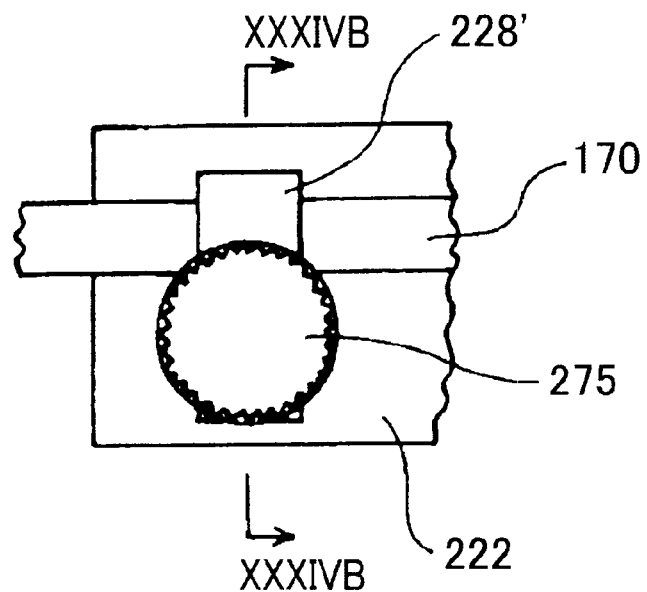
FIG. 34A is a schematic side view showing a modification of the fixing clip.
Figure 34B:
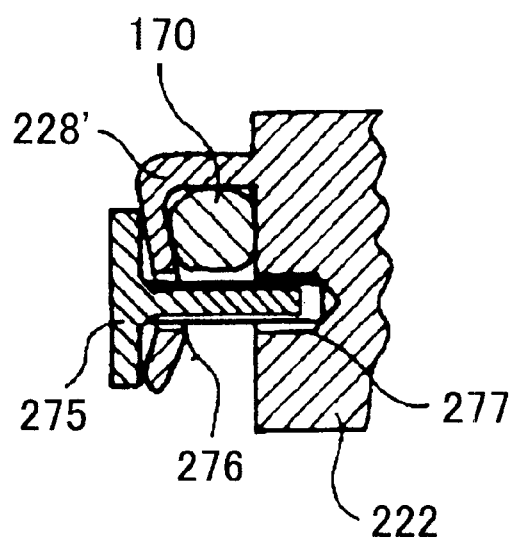
FIG. 34B is a cross-sectional view taken along a line XXXIVB—XXXIVB of FIG. 34A.

The fixing clip 228 can be modified into a fixing clip 228' as shown in FIGS. 34A and 34B. FIG. 34A is a side view of the fixing clip 228' that is clipped onto the left side of the pair of glasses, and FIG. 34B is a cross-sectional view taken along a line XXIVB—XXIVB of FIG. 34A. The structure of the fixing clip 228' of this modification is the same as that of the fixing clip 228 (FIG. 32) except that the fixing clip 228' is further formed with a through-hole 276. In correspondence with this modification, the fixing casing 222 is formed with a screw hold 277 at a position corresponding to the through-hole 276. Further, an attachment screw 275 is screwing fixed into the screw hold 277 through the through-hole 276. The fixing casing 222 is fixed onto the left ear piece portion 170 in the pair of glasses by the attachment screw 275. Because the fixing casing 222 of this modification is mounted by the screw mechanism, the fixing casing 222 can be readily attached to the pair of glasses. Therefore, the possibility of the head mount display 220 falling off the pair of glasses is greatly reduced. The other fixing clip 228 can be modified in the same manner as the fixing clip 226.

While the invention has been described in detail with reference to the specific embodiment thereof, it would be apparent to those skilled in the art that various changes and modifications may be made therein without departing from the spirit of the invention.

For example, in each of the displays shown in FIGS. 17 through 34B in the second embodiment, the white LED 12 and the user's pupil have the substantial conjugate relationship with each other as shown in FIG. 12. However, it is unnecessary that the white LED 12 and the user's pupil have the substantial conjugate relationship with each other. It is sufficient that the liquid crystal display 16 and the user's retina have the substantial conjugate relationship with each other. In other words, the imaging lens 18, the mirror 19, or the half mirror 370 may be located at such a position that only the liquid crystal display 16 and the user's retina have a substantial conjugate relationship but that the white LED 12 and the user's pupil do not have a substantial conjugate relationship as shown in FIG. 16.

In the above-described embodiments, the white LED 12 is used as a point light source. However, a semiconductor laser can be used instead because the semiconductor laser has a light emitting area of 1 $\mu m^2$. In this case, the liquid crystal display 16 serves to modulate the laser beam from the semiconductor laser.

In the above-described embodiments, the liquid crystal display of a transmission type 16 is employed in the display devices. However, a reflection type liquid crystal display or a deformable mirror device (DMD) can be used instead as a spatial light modulator.

In the above-described embodiments, the image pick up unit, comprised from the CCD camera 372, is mounted only to the head-mount type display devices shown in FIGS. 8–11 and 20–21. However, the image pick up unit can be mounted to other types of display devices shown in FIGS. 4–6 and 17–18. Especially when the image pick up unit is mounted to the type of display device that has a holding portion enabling a user to transport the display device with him/herself, the display device can be used as a portable television telephone. Because the display device of the present invention employs the point light source, the display device attains a low power consumption. It is sufficient to mount a small battery to the display device. The entire potable television telephone can therefore be made small and light weight.

Figure 35A:
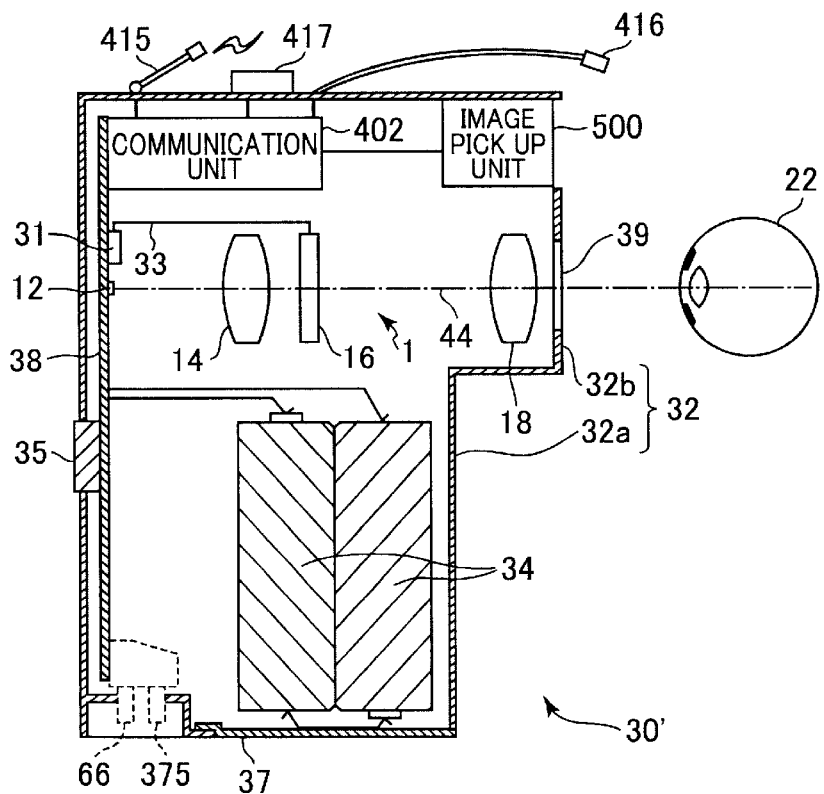
FIG. 35A is a schematic view showing a modification of a hand held type portable display that includes the display device of the first embodiment and that includes an image pick up unit.
Figure 35B:
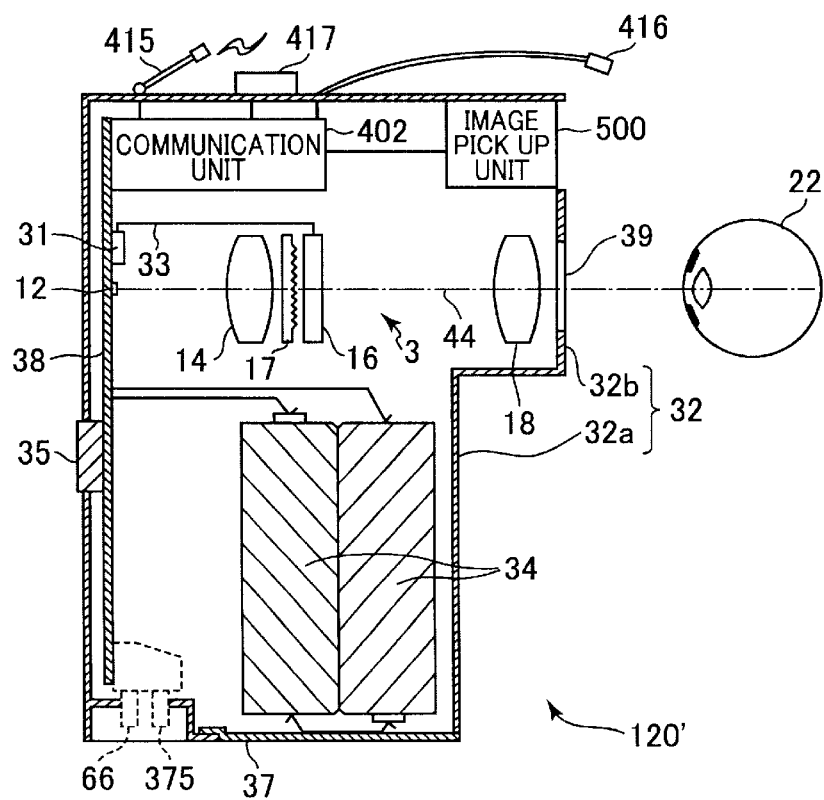
FIG. 35B is a schematic view showing a modification of a hand held type portable display that includes the display device of the second embodiment and that includes an image pick up unit.

For example, an image pick up unit 500 having the CCD camera 372 and the communication unit 402 having the structure the same as shown in FIGS. 11 and 21 can be mounted to the hand-held portable display 30 of FIG. 4 in a manner as shown in FIG. 35A. Similarly, the image pick up unit 500 and the communication unit 402 can be mounted to the hand-held portable display 120 of FIG. 17 in a manner as shown in FIG. 35B. In each of these modifications, the microphone 416 and the speaker 417 are connected to the communication unit 402 in the same manner as shown in FIGS. 11 and 21. The thus modified hand-held portable displays 30' and 120' can be utilized as portable wireless television-telephones that wirelessly communicate images and voices with remote communicating machines.

It is noted that the communication unit 402 may not be provided in the portable display 30' or 120'. Instead, an input video connector 66 and an output video connector 375 may be provided to the portable displays 30' and 120' as indicated by dotted lines in the figures. In the same manner as in FIGS. 8 and 20, the input connector 66 is provided as being electrically connected to the driving circuit (not shown) for the liquid crystal display 16 and so that the output connector 375 is provided as being electrically connected to the CCD camera 372. In this modification, the portable displays 30' and 120' will be connected to the mobile computer 383 in the manner shown in FIG. 10. The portable displays 30' and 120' can attain telecommunication of images when the mobile computer 383 is connected to a telephone circuit. In the same and similar manners as described above, other various types of display devices of the present invention can be applied to a television telephone.

Each of the display devices according to the above-described embodiments includes the condenser lens 14. However, the condenser lens 14 may be omitted from the display devices. Because the display device of the present invention employs the point light source 12, even when the condenser lens 14 is not provided, light emitted from the liquid crystal display 16 will scatter at a small amount of degree. In other words, light will emit from the liquid crystal display 16 at a small angle of emission. Accordingly, even when a user's eye slightly moves along the optical axis of the display device, the image formed on the user's eye will not become out of focus.

What is claimed is:

1. A display device, comprising:
   a point light source that emits white light;
   a spatial light modulator spatially modulating the light emitted from the point light source to produce an imaging light; and
   an optical imaging lens receiving the imaging light modulated by the spatial light modulator and focusing the imaging light to produce an image, wherein the point light source has a light emitting area of less than or equal to 1 mm$^2$ and the spatial light modulator emits the modulated imaging light at a small angle of emission such that almost all of the modulated imaging light falls incident on the optical imaging lens.

2. A display device, comprising:
   a point light source that emits white light;
   an optical light-collecting system gathering the light from the point light source;
   a spatial light modulator spatially modulating the light emitted from the point light source to produce an imaging light; and
   an optical imaging system receiving the imaging light modulated by the spatial light modulator and producing an image, wherein the point light source has a light emitting area of less than or equal to 1 mm$^2$ and the spatial light modulator receives the light collected by the optical light-collecting system and spatially modulates the light to produce the imaging light.

3. A display device as claimed in claim 2, wherein the optical imaging system is located at a position to cause the spatial light modulator and a retina of a user's eye to have substantially a conjugate relationship with each other.

4. A display device, comprising:
   a point light source that emits white light;
   a spatial light modulator spatially modulating the light emitted from the point light source to produce an imaging light;
   an optical imaging system receiving the imaging light modulated by the spatial light modulator and producing an image; and
   an optical light-collecting system gathering the light from the point light source, the spatial light modulator receiving the light collected by the optical light-collecting system and spatially modulating the light to produce the imaging light, wherein the optical imaging system is located to cause the point light source and a first position that is located behind the optical imaging system and that is separated from the optical imaging system by a desired distance to have substantially a conjugate relationship and to cause the spatial light modulator and a second position that is located behind the first position and that is separated from the first position by a distance substantially equal to a distance between a pupil and a retina of a user's eye to have substantially a conjugate relationship.

5. A display device as claimed in claim 2, wherein the point light source includes a blue light emission diode provided with a fluorescent material at its outside portion.

6. A display device as claimed in claim 2, wherein the point light source includes an ultraviolet light emission diode provided with a fluorescent material at its outside portion.

7. A display device as claimed in claim 2, further comprising a scattering plate located between the point light source and the spatial light modulator.

8. A display device, comprising:
   a point light source that emits white light;
   a spatial light modulator spatially modulating the light emitted from the point light source to produce an imaging light;
   an optical imaging system receiving the imaging light modulated by the spatial light modulator and producing an image;
   an optical light-collecting system gathering the light from the point light source, the spatial light modulator receiving the light collected by the optical light-collecting system and spatially modulating the light to produce the imaging light; and
   a scattering plate located between the point light source and the spatial light modulator, wherein the optical imaging system is located to cause the point light source and a first position that is located behind the optical imaging system and that is separated from the optical imaging system by a desired distance to have substantially a conjugate relationship and to cause the spatial light modulator and a second position that is located behind the first position and that is separated from the first position by a distance substantially equal to a distance between a pupil and a retina of a user's eye to have substantially a conjugate relationship.

9. A display device, comprising:
   a point light source that emits white light;
   a spatial light modulator spatially modulating the light emitted from the point light source to produce an imaging light;
   an optical imaging system receiving the imaging light modulated by the spatial light modulator and producing an image;
   an optical light-collecting system gathering the light from the point light source, the spatial light modulator receiving the light collected by the optical light-collecting system and spatially modulating the light to produce the imaging light; and
   a scattering plate located between the point light source and the spatial light modulator, wherein the scattering plate scatters the light with a luminous intensity distribution of $I(\theta)=\cos^n\theta$ where I is the luminous intensity and $\theta$ is a deviation angle from a predetermined reference direction normal to the scattering plate and where n is greater than or equal to three and less than or equal to 100.

10. A display device as claimed in claim 2, further comprising a casing that houses therein the point light source, the optical light-collecting system, the spatial light modulator, and the optical imaging system.

11. A display device, comprising:
    a point light source that emits white light;
    a spatial light modulator spatially modulating the light emitted from the point light source to produce an imaging light;
    an optical imaging system receiving the imaging light modulated by the spatial light modulator and producing an image;
    an optical light-collecting system gathering the light from the point light source, the spatial light modulator receiving the light collected by the optical light-collecting system and spatially modulating the light to produce the imaging light; and a casing that houses therein the point light source, the optical light-collecting system, the spatial light modulator, and the optical imaging system, wherein the casing has a portion for being mounted on a stand.

12. A display device as claimed in claim 10, further comprising a holding portion that enables a user to transport the casing.

13. A display device as claimed in claim 12, wherein the holding portion includes a portion for being supported by at least one hand of a user, the casing having a window allowing the user to observe the image formed by the optical imaging system.

14. A display device as claimed in claim 12, wherein the holding portion includes a portion for being attached to a user's head.

15. A display device as claimed in claim 14, wherein the optical imaging system functions to reflect the light modulated by the spatial light modulator in a direction toward a face of the user.

16. A display device as claimed in claim 12, wherein the holding portion includes a portion for being attached to a frame of a pair of glasses.

17. A display device as claimed in claim 12, further comprising an image pick up device for picking up an image of the user's face.

18. A display device, comprising:
a point light source that emits white light;
a spatial light modulator spatially modulating the light emitted from the point light source to produce an imaging light;
an optical imaging system receiving the imaging light modulated by the spatial light modulator and producing an image;
an optical light-collecting system gathering the light from the point light source, the spatial light modulator receiving the light collected by the optical light-collecting system and spatially modulating the light to produce the imaging light;
a casing that houses therein the point light source, the optical light-collecting system, the spatial light modulator, and the optical imaging system;
a holding portion that enables a user to transport the casing; and
an image pick up device for picking up an image of the user's face, wherein the optical imaging system includes a half mirror for allowing the light from the spatial light modulator to reflect thereat to reach the user's eye, while allowing the light from the user's face to pass therethrough to reach the image pick up device.

19. A display device as claimed in claim 17, wherein the image pick up device picks up an image within a predetermined image pickup range, the spatial light modulator being located outside the predetermined image pickup range.

20. A display device as claimed in claim 17, further comprising a communication unit that transmits data of the image picked up by the image pick up device to a remote communication unit and that receives data of an image to be displayed by the spatial light modulator from the remote communication unit.

21. A display device as claimed in claim 20, wherein the communication unit includes a telephone device including a call reception device, a microphone, and a speaker.

22. A display device as claimed in claim 20, wherein the communication unit includes a moving picture encoder and a moving picture decoder.

23. A display device as claimed in claim 20, wherein the communication unit includes a wireless communication device.

24. A display device as claimed in claim 18, wherein the half mirror has optical power in at least one of its light reflecting characteristic and its light transmitting characteristic.

25. A display device, comprising:
a point light source that emits white light;
a spatial light modulator spatially modulating the light emitted from the point light source to produce an imaging light; and
an optical imaging system receiving the imaging light modulated by the spatial light modulator and producing an image, wherein the point light source includes a blue light emission diode provided with a fluorescent material at its outside portion.

26. A display device as claimed in claim 25 further comprising:
an optical light-collecting system gathering the light from the point light source, the spatial light modulator receiving the light collected by the optical light-collecting system and spatially modulating the light to produce the imaging light; and
a scattering plate located between the point light source and the spatial light modulator.

27. A display device, comprising:
a point light source that emits white light;
a spatial light modulator spatially modulating the light emitted from the point light source to produce an imaging light; and
an optical imaging system receiving the imaging light modulated by the spatial light modulator and producing an image, wherein the point light source includes an ultraviolet light emission diode provided with a fluorescent material at its outside portion.

28. A display device as claimed in claim 27 further comprising:
an optical light-collecting system gathering the light from the point light source, the spatial light modulator receiving the light collected by the optical light-collecting system and spatially modulating the light to produce the imaging light; and
a scattering plate located between the point light source and the spatial light modulator.

* * * * *